(12) United States Patent
Witt

(10) Patent No.: US 8,264,546 B2
(45) Date of Patent: Sep. 11, 2012

(54) IMAGE PROCESSING SYSTEM FOR ESTIMATING CAMERA PARAMETERS

(75) Inventor: Sarah Elizabeth Witt, Winchester (GB)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 12/557,925

(22) Filed: Sep. 11, 2009

(65) Prior Publication Data

US 2010/0134634 A1 Jun. 3, 2010

(30) Foreign Application Priority Data

Nov. 28, 2008 (GB) .................................. 0821832.3

(51) Int. Cl.
*H04N 17/00* (2006.01)
(52) U.S. Cl. ..................................... 348/187; 348/222.1
(58) Field of Classification Search .................. 348/181, 348/180, 187, 188, 222.1; 382/285, 286, 382/288, 287, 289
See application file for complete search history.

(56) References Cited

U.S. PATENT DOCUMENTS

| 5,502,482 A * | 3/1996 | Graham ........................ 348/140 |
| 6,304,298 B1 * | 10/2001 | Steinberg et al. ............ 348/587 |
| 7,177,740 B1 | 2/2007 | Guangjun et al. |
| 2006/0290920 A1 | 12/2006 | Kämpchen et al. |
| 2007/0196016 A1 | 8/2007 | Chen et al. |

FOREIGN PATENT DOCUMENTS

| GB | 2 271 241 A | 4/1994 |
| GB | 2 305 050 A | 3/1997 |

* cited by examiner

*Primary Examiner* — Nelson D. Hernández Hernández
(74) *Attorney, Agent, or Firm* — Oblon, Spivak, McClelland, Maier & Neustadt, L.L.P.

(57) ABSTRACT

An image processing system includes a camera, an image processor and a calibration surface including a calibration pattern, comprising plural alternately colored elements which provide a corresponding plurality of corners at locations at which more than two of the colored elements adjoin. The image processor detects from the video signal at least some of the corner locations and identifies a first and second group of lines of the calibration pattern, extrapolate the lines from each group and determine a on a plane of the scene as viewed by the camera, the presence and location of a first and second intersection points on where the extrapolated lines from the first and second groups, respectively, intersect to estimate one or more of a roll pitch and yaw angle of the camera relative to the calibration surface and extimates a likelihood that a corner is located at each of identified potential corner locations.

16 Claims, 27 Drawing Sheets

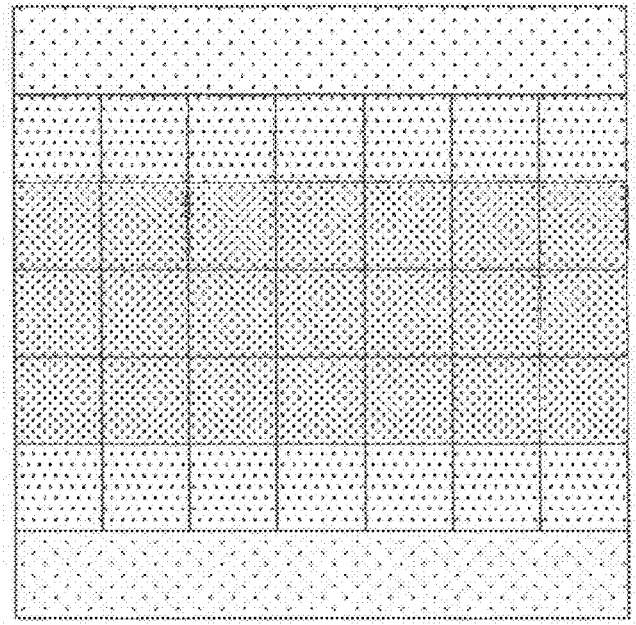
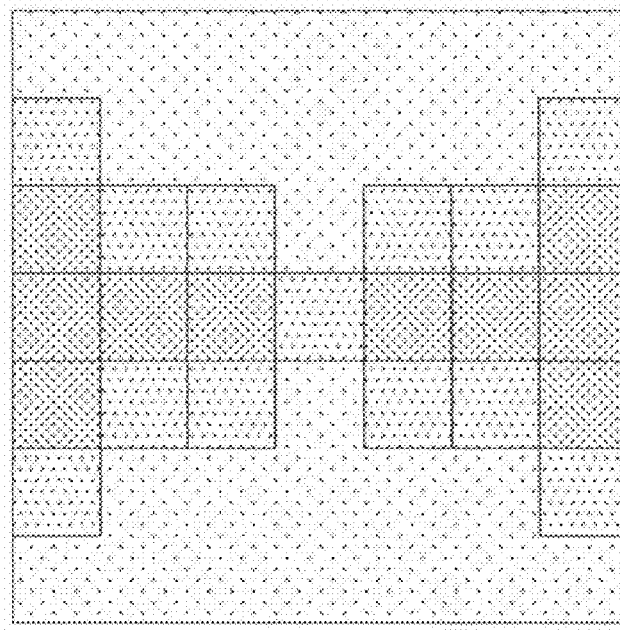
FIG. 9

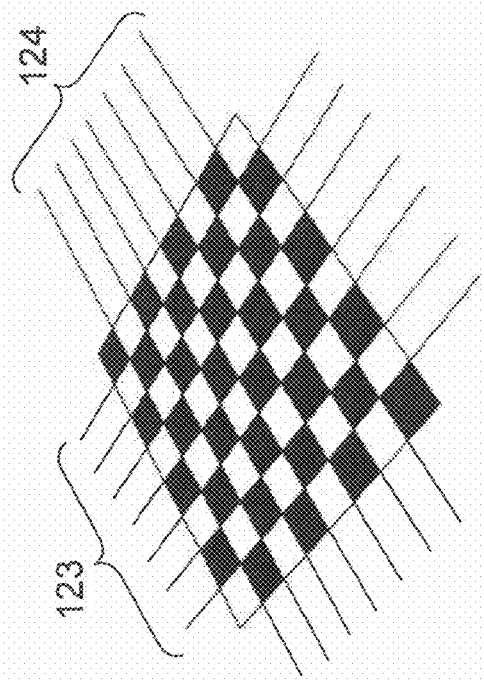
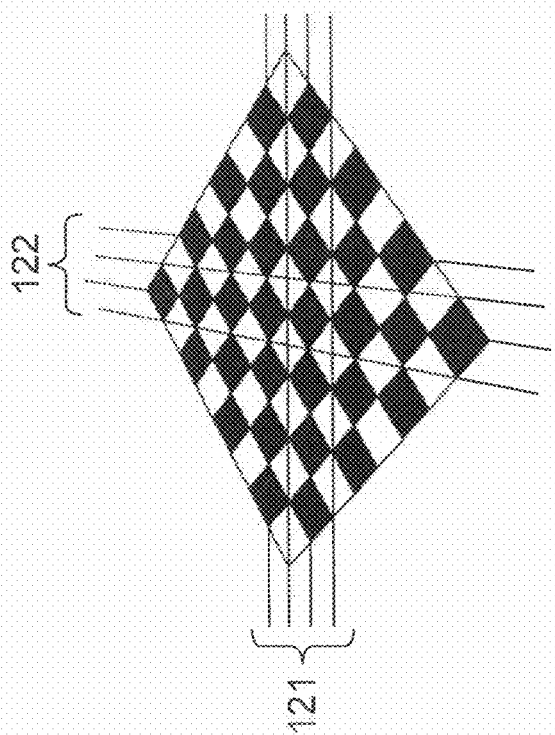
FIG. 12A
FIG. 12B

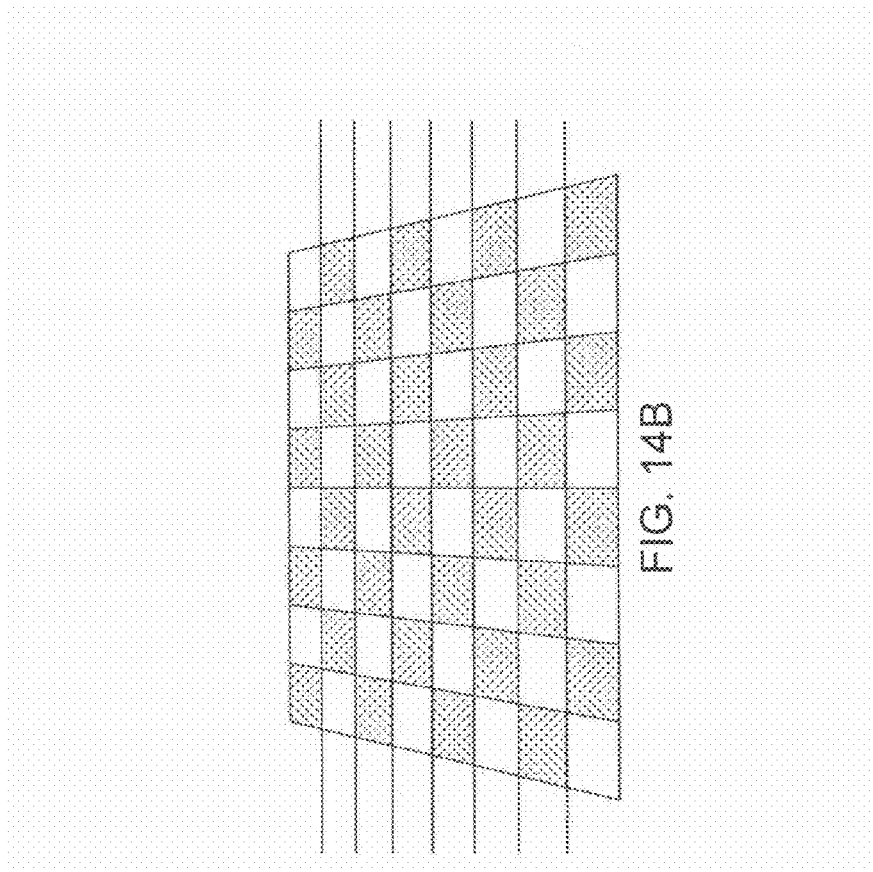
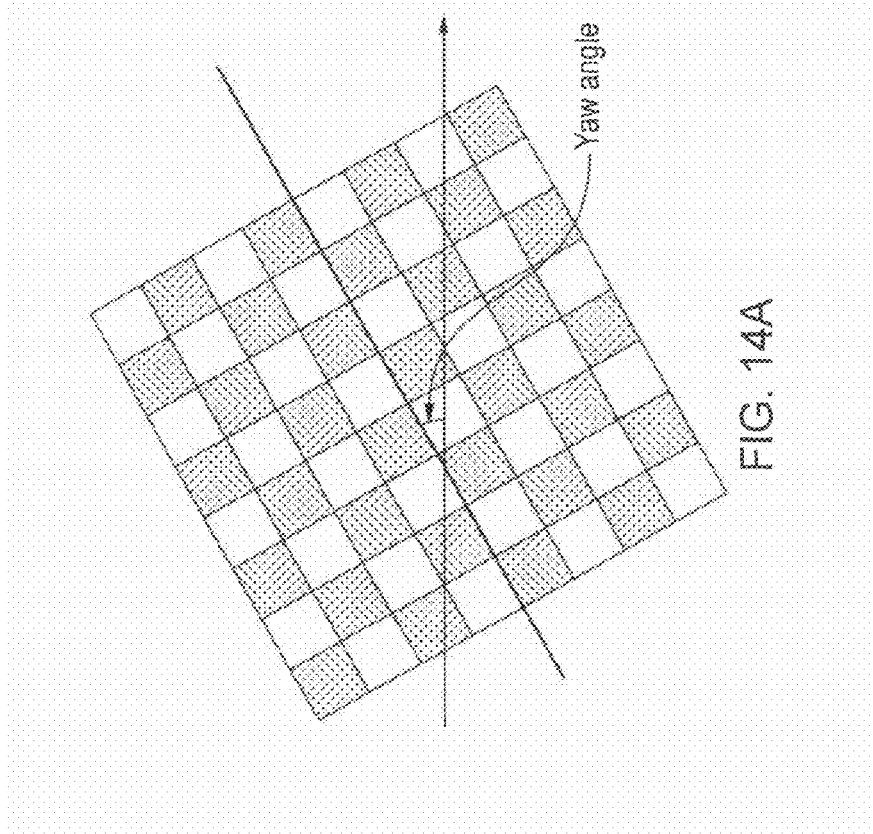

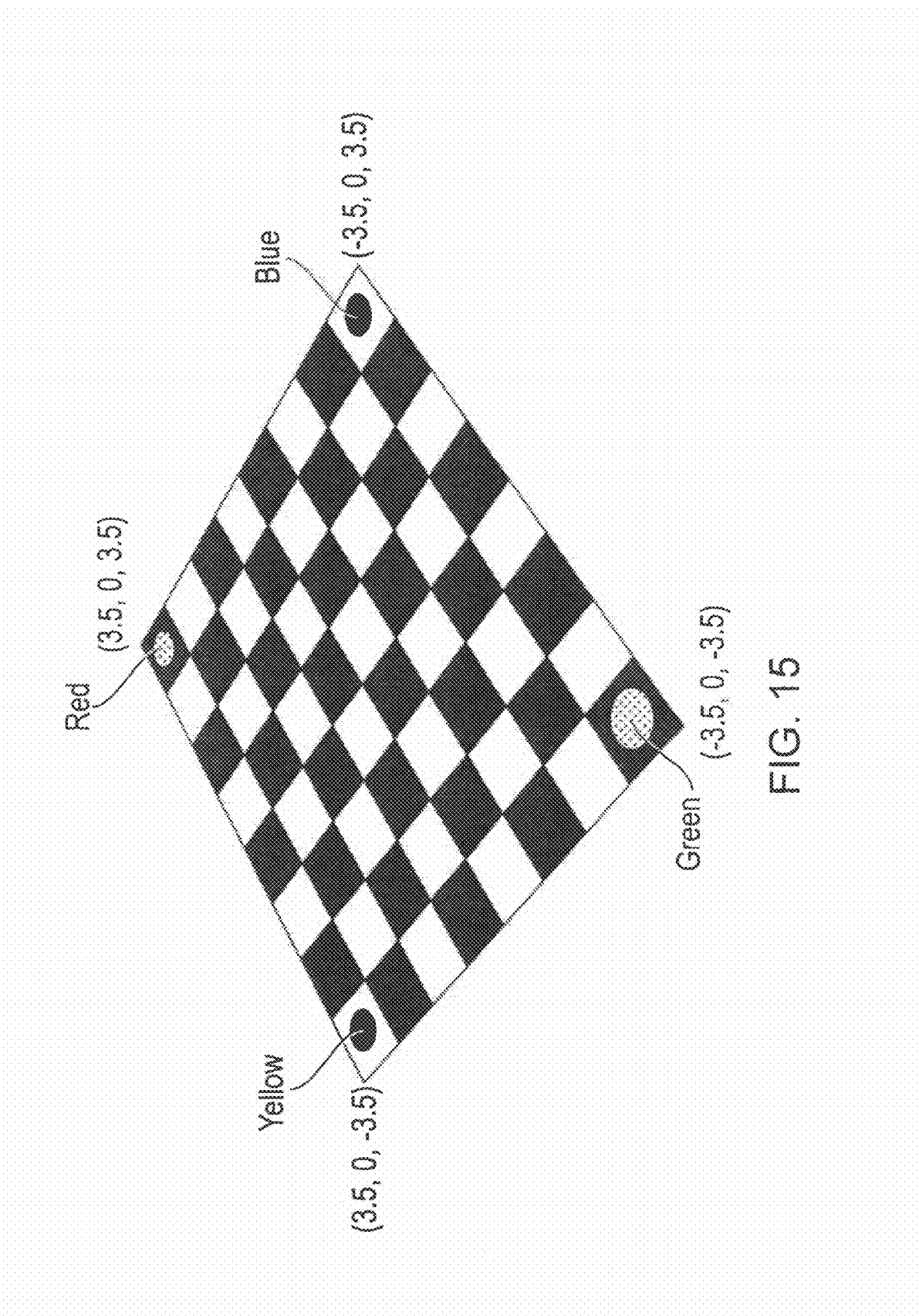

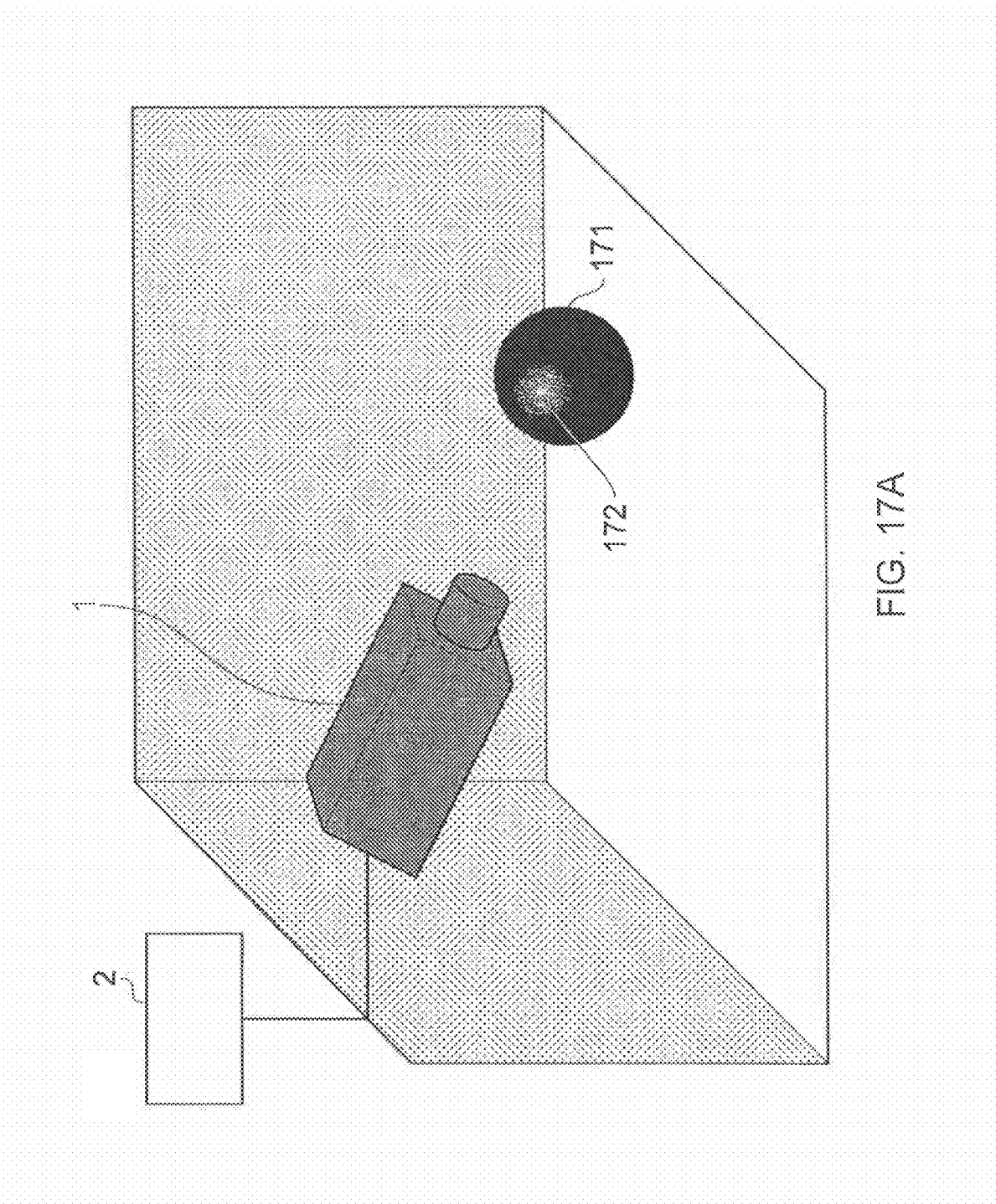

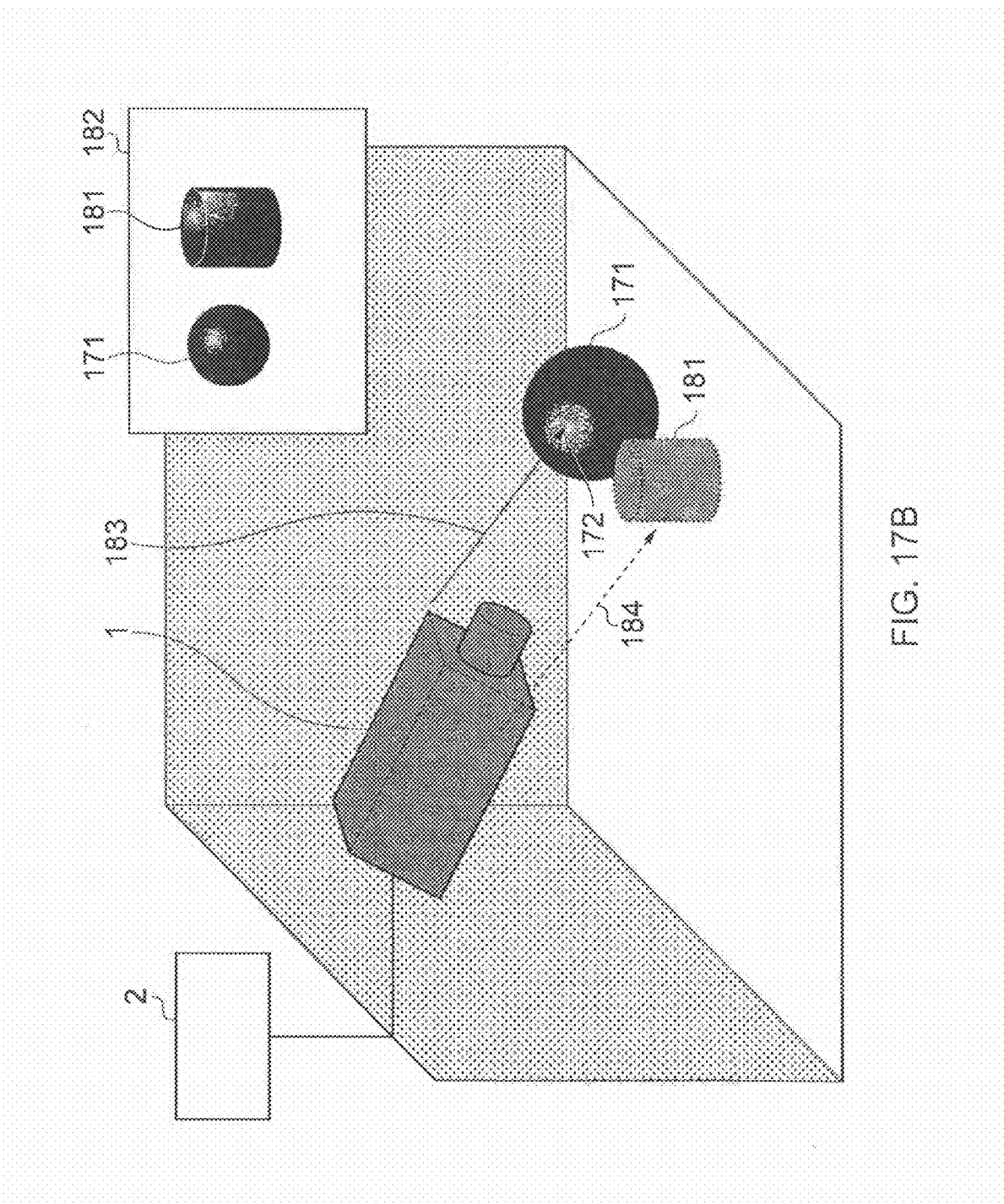

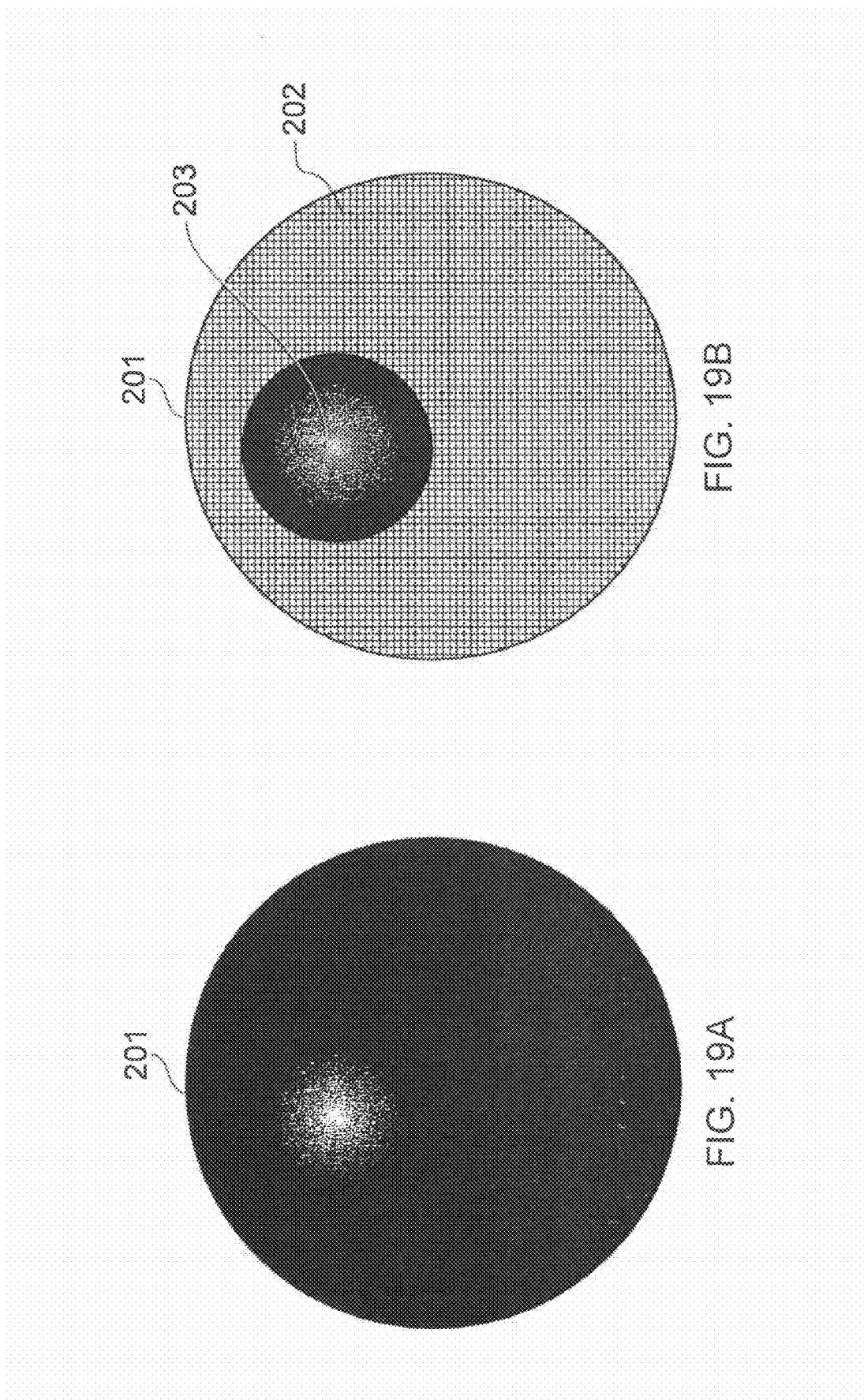

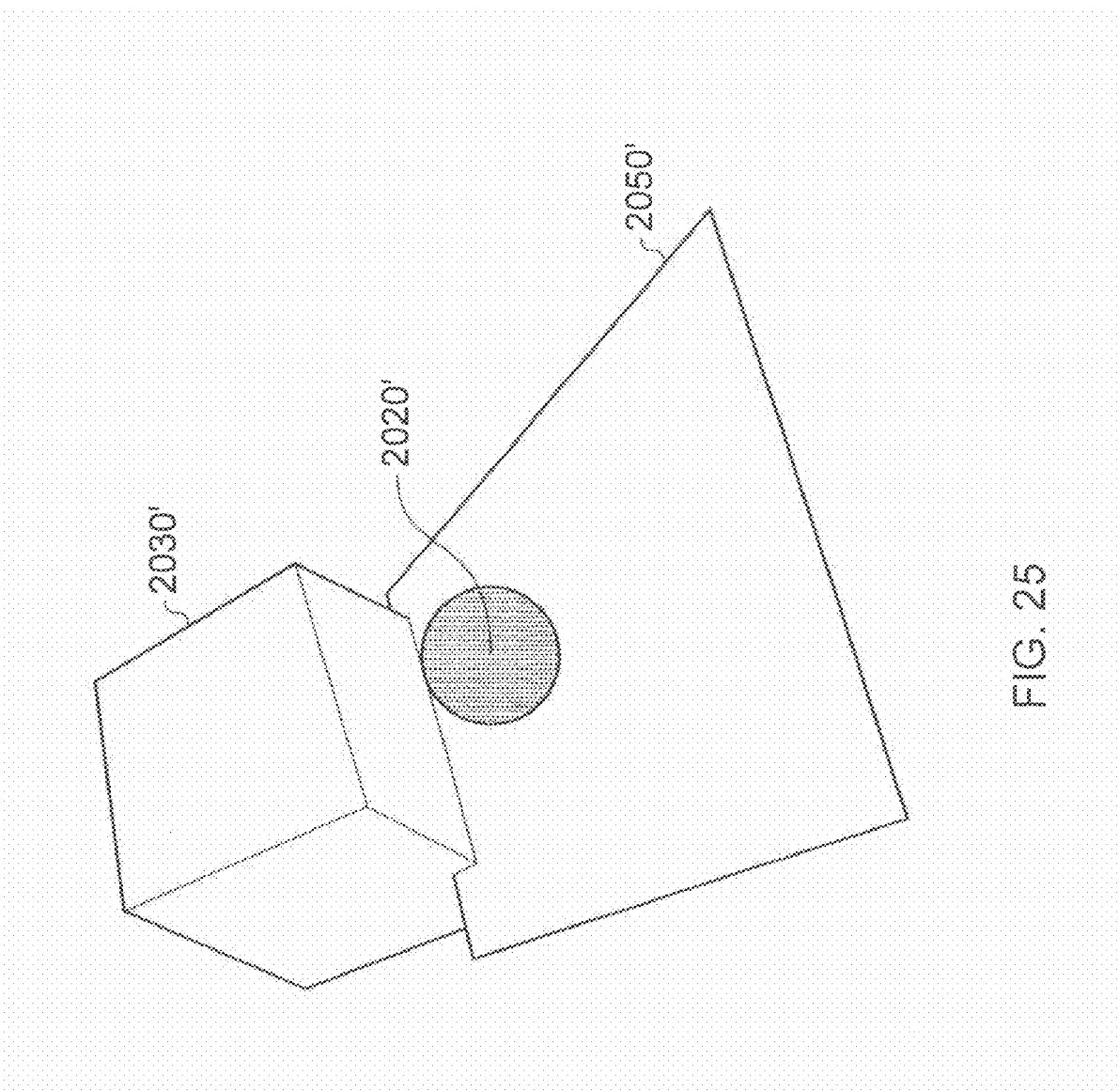

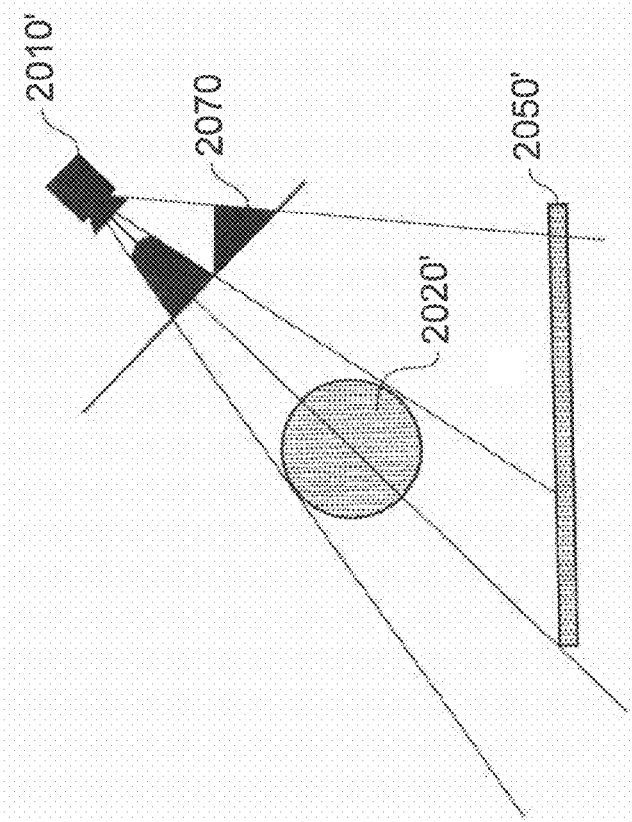
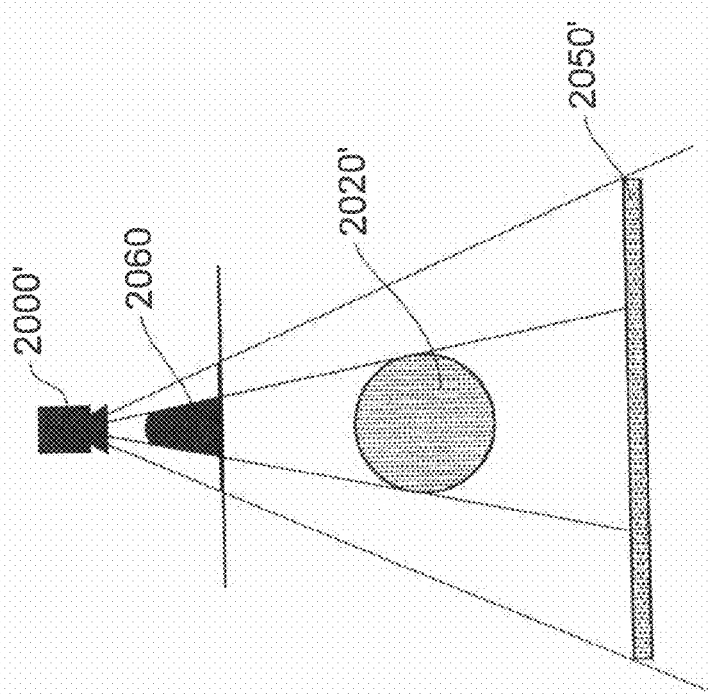
FIG. 26B
FIG. 26A

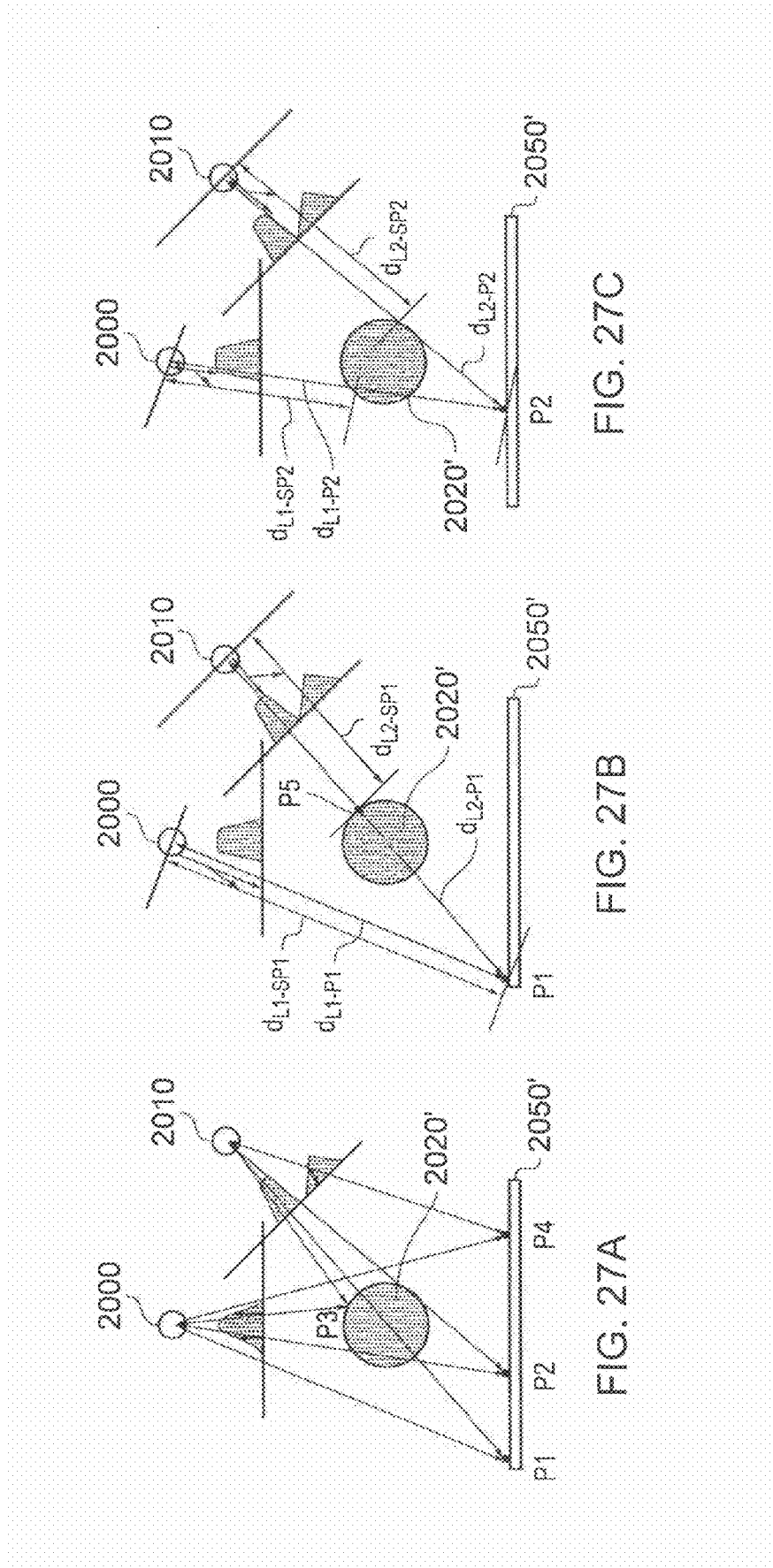

IMAGE PROCESSING SYSTEM FOR ESTIMATING CAMERA PARAMETERS

FIELD OF THE INVENTION

The present invention relates to image processing. More particularly embodiments of the present invention relate to methods of and systems for estimating camera parameters from a captured image.

BACKGROUND OF THE INVENTION

In many applications it is desirable to add computer generated graphics to enhance conventionally captured video images. For example, news broadcasts and televised weather forecasts frequently include computer generated content such as text banners, maps, backdrops and so on, which are added to conventionally captured video images of a human presenter. Such computer generated content can improve the clarity with which information is presented to a viewer and can be easily and conveniently edited and updated. Similarly, many modern films include a great deal of computer generated content which is intermixed with real-life actors and objects to achieve effects which would be impossible or very expensive to achieve in real life.

In some situations, adding a computer graphic to real life video is quite straightforward. For example, adding a simple and static two dimensional graphic overlay on a video scene. However, adding a computer generated graphic into a video scene such that it appears to be realistically placed in three dimensional space can be much more difficult, particularly if the position of a camera capturing the real-life scene is changing. Furthermore, it can be difficult to render computer generated graphics so that they appear to be lit in the same manner as real-life objects in the scene. It is possible to achieve realistic looking results if the captured video is processed after being captured and frame by frame adjustments are made to ensure a realistic position and lighting of the computer generated object is maintained. However, this is time consuming and is not practical for applications which demand a computer generated object be realistically placed and lit in a video scene in real time.

Additionally, the inclusion of computer generated shadows in a combined display of computer generated content and conventionally captured video images can greatly enhance an appearance of realism for a user. However, it can be difficult to achieve realistic looking results if a virtual object is to cast a computer generated shadow on a real object. In particular, it can be difficult to render the computer generated shadow such that it appears to be cast on the real object if there are one or more virtual light sources in the scene or where a computer generated object is to be inserted into a scene such that it should cast shadows caused by the virtual object occluding a real light source.

SUMMARY OF THE INVENTION

According to an aspect of the present invention there is provided an image processing system comprising a camera, an image processor and a calibration surface. The calibration surface includes thereon a calibration pattern, the calibration pattern comprising a plurality of alternately coloured elements which provide a corresponding plurality of corners at locations on the calibration pattern at which more than two of the coloured elements adjoin. In one example the alternately coloured elements are black and white, for example a checkerboard, but any other combination of colour or different shades of the same colour could be employed. The corner locations define a first and second group of lines, the lines in each of the group of lines are parallel with respect to each other and with respect to the calibration surface. The first group of lines is orthogonal to the second group of lines and the camera is operable to generate a video signal representative of a scene as viewed by the camera, the scene including the calibration surface. The image processor is operable to detect from the video signal at least some of the corner locations and thereby identify the first and second group of lines of the calibration pattern, to extrapolate the lines from each group of lines to determine a presence and a location of a first intersection point on a plane of the scene as viewed by the camera at which the extrapolated lines from the first group intersect and a second intersection point on the plane of scene as viewed by the camera at which the extrapolated lines from the second group intersect, and to estimate from the presence and the location of the first and second intersection points one or more of an estimated roll angle value, an estimated pitch angle value and an estimated yaw angle value corresponding to a roll angle, pitch angle and yaw angle of the camera relative to the calibration surface. The detection of the corner locations by the image processor comprises identifying from the video signal a plurality of potential corner locations, defining an area of the scene as viewed by the camera centred around each potential corner location, analysing a colour of points lying on a periphery of each area, thereby estimating a likelihood that a corner is located at each potential corner location.

The present invention provides a system in which an image processor is able to estimate the orientation of a camera from a video signal generated by the camera which is representative of a scene including a calibration surface on which is provided a number coloured elements from which corner locations can be derived. The invention takes advantage of the fact that the orientation of a surface comprising parallel lines can be determined from a two dimensional image of that surface by determining the point at which those parallel lines intersect on the plane of the captured image. Embodiments of the invention provide a mechanism by which the parallel lines can be identified by determining the location of corner features of the calibration surface by defining an area centred around each potential corner location and analysing a colour of points lying on a periphery of the defined area. This mechanism provides a particularly quick and efficient way of identifying the location of corners on the calibration surface which can be readily implemented and undertaken in real time. The present invention therefore has numerous applications but in particular allows for computer generated objects to be incorporated into images and video taken by the camera whilst allowing the orientation of the camera to be taken into account when rendering the computer generated object.

In another embodiment, the image processor is operable to detect from the video signal representative of the scene including the calibration pattern, a plurality of features of a predetermined distance apart on the calibration surface and to determine an estimated centre point of the calibration surface from the distribution of the plurality of features over the calibration pattern and to determine an estimated X displacement value, an estimated Y displacement value and an estimated Z displacement, the estimated X, Y and Z displacement values corresponding to a position in three dimensional space of a position of the camera relative to the calibration surface.

In this further embodiment, the position of the camera can be estimated in addition to the orientation of the camera. Therefore, both the orientation and the relative location of the camera can be determined. This embodiment allows, for example, computer generated objects to be combined with images captured by the camera with even greater accuracy and realism as both the location and orientation of the camera can be taken into account when rendering the computer generated object.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 9 shows a "genuine" checkerboard corner and a "false positive" checkerboard corner;

FIG. 12a shows two 45 degree diagonal line groups on the checker board;

FIG. 12b shows a horizontal line group and a vertical line group on the checker board;

FIGS. 14a and 14b illustrate positions of the checkerboard in two special case camera orientations;

FIG. 15 shows a schematic diagram of the checkerboard calibration pattern including four coloured markers;

FIGS. 17a and 17b provide schematic diagrams illustrating a technique for estimating a direction of a light source;

FIGS. 19a and 19b illustrate clipping a luminance distribution across the surface of the reference object;

FIG. 25 is a schematic diagram illustrating an example scene comprising virtual objects;

FIGS. 26A and 26B are schematic diagram of rendering passes used to generate shadow maps; and FIGS. 27A to 27C are schematic diagrams of a third rendering pass used to generate a shadow map illustrating how a shadow map for different light sources is generated.

DESCRIPTION OF EXAMPLE EMBODIMENTS

Figure 1:
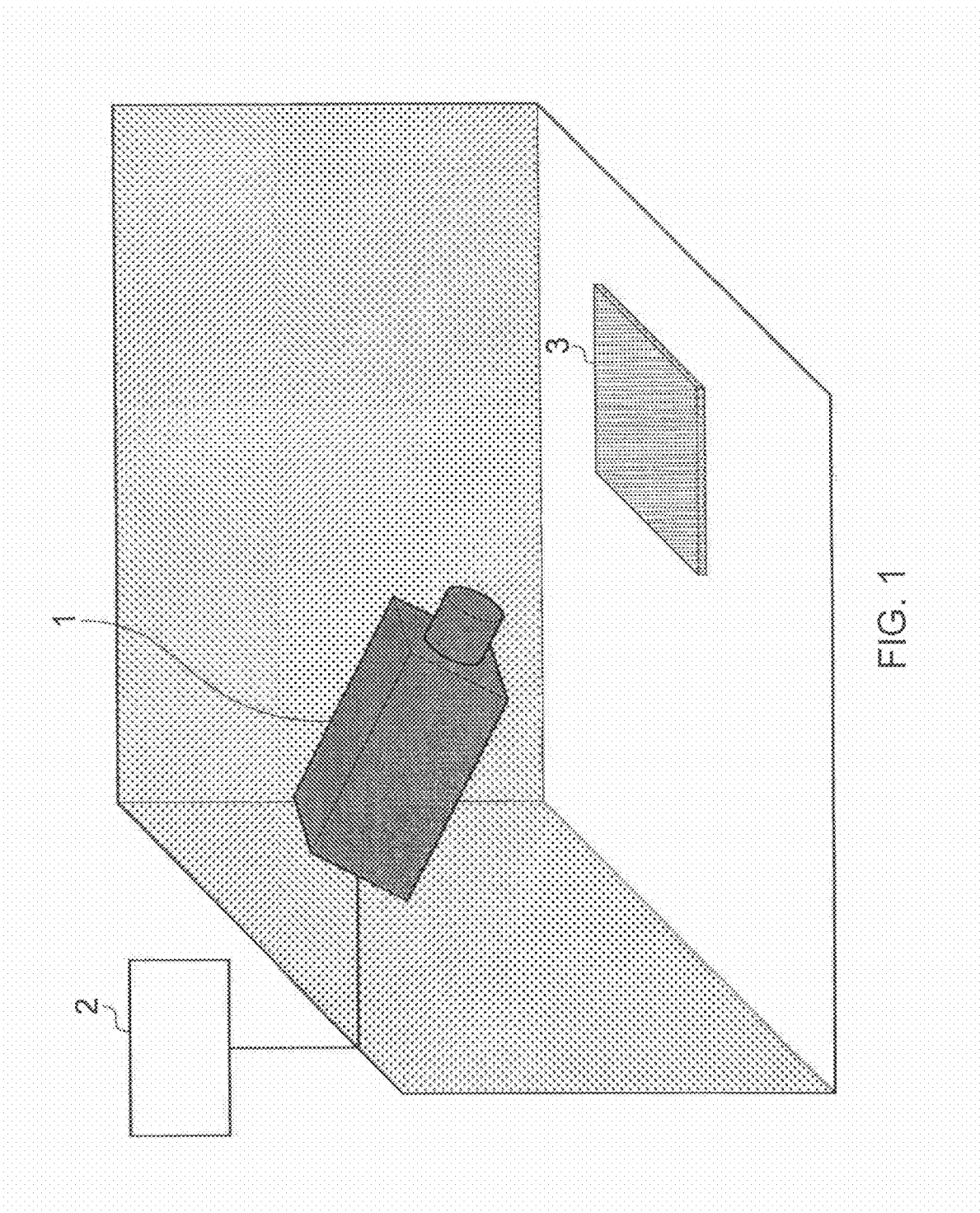
FIG. 1 provides a schematic diagram of a camera and image processor arranged in accordance with a technique of determining camera parameters from a captured image.

FIG. 1 provides a schematic diagram of an example of a system for determining camera parameters from a captured image. A camera apparatus 1 is provided which is capable of capturing image data, for example a video signal, representative of a scene as viewed by the camera 1. The camera 1 is connected to an image processor 2. Together the camera 1 and image processor 2 comprise an image processing apparatus. The camera is directed at a calibration surface 3. The camera 1 captures image data representative of the calibration surface 3 and communicates data corresponding to these images back to the image processor 2. The calibration surface 3 includes a calibration pattern. The image processor 2 analyses the images captured by the camera 1 of the calibration surface and uses information derived from the captured images of the calibration surface 3 to determine a set of parameters corresponding to the orientation of the camera 1 relative to the calibration surface 3.

Figure 2:
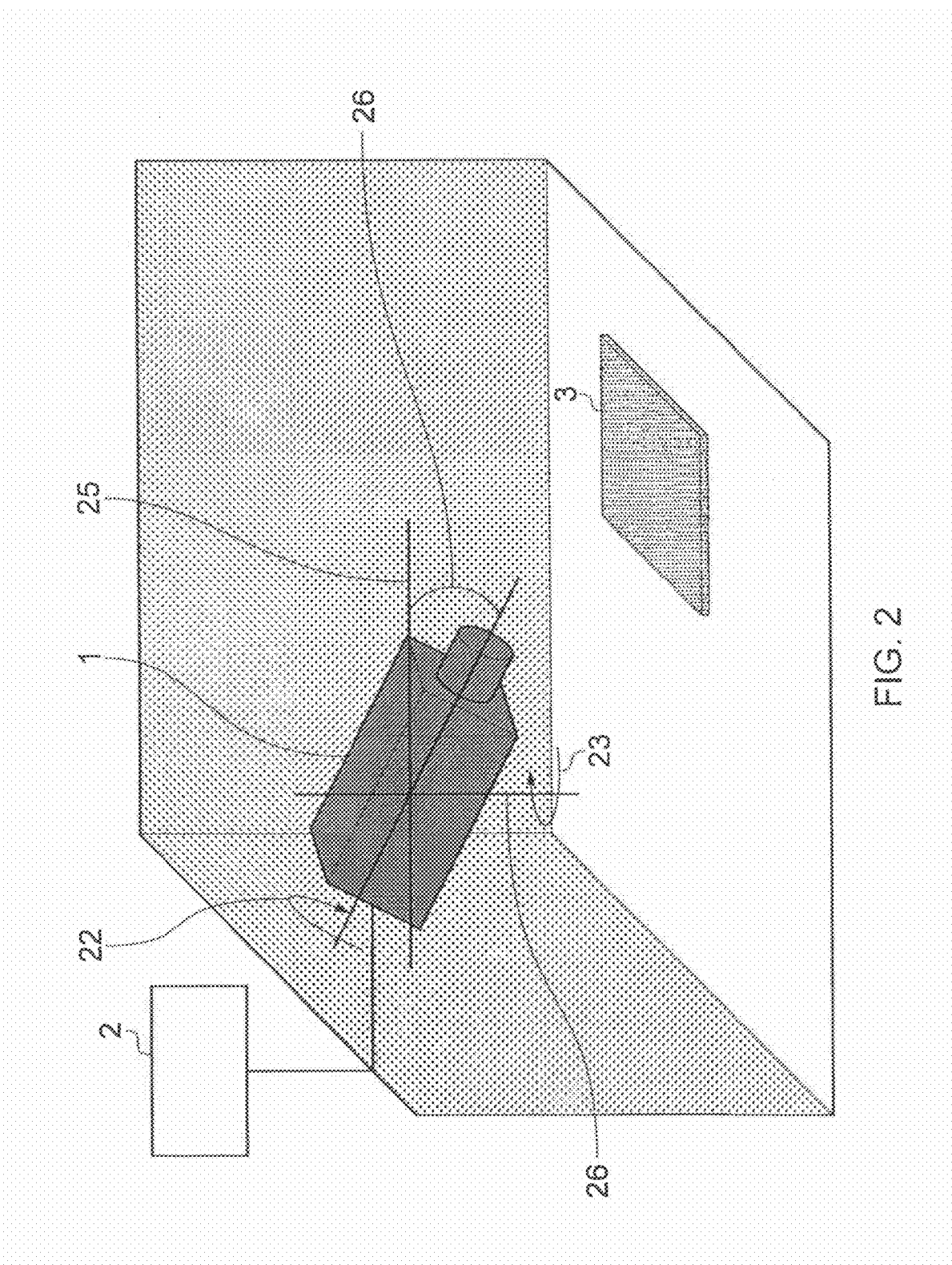
FIG. 2 provides a schematic diagram of the camera and image processor arranged in accordance with an example of the technique of determining camera parameters from the captured image including an illustration of the camera orientation and position parameters.

FIG. 2 illustrates parameters that define the orientation of the camera. A first angle 21 corresponds to the pitch of the camera. This pitch angle 21 corresponds to an amount by which a centre axis 24 of the camera 1 deviates from a horizontal axis 25. The horizontal axis 25 is horizontal relative to the calibration surface 3. A roll angle 22 corresponds to the amount the camera 1 rotates around the centre axis 24 of the camera 1 relative to the calibration surface 3. A yaw angle 23 corresponds to an amount by which the camera rotates around a vertical axis 26 of the camera 1 relative to the calibration surface 3. In some examples, the image processor 2 also determines x, y and z coordinate values which correspond to the position of the camera 1 in three dimensional space, relative to the calibration surface 3.

Figure 3:
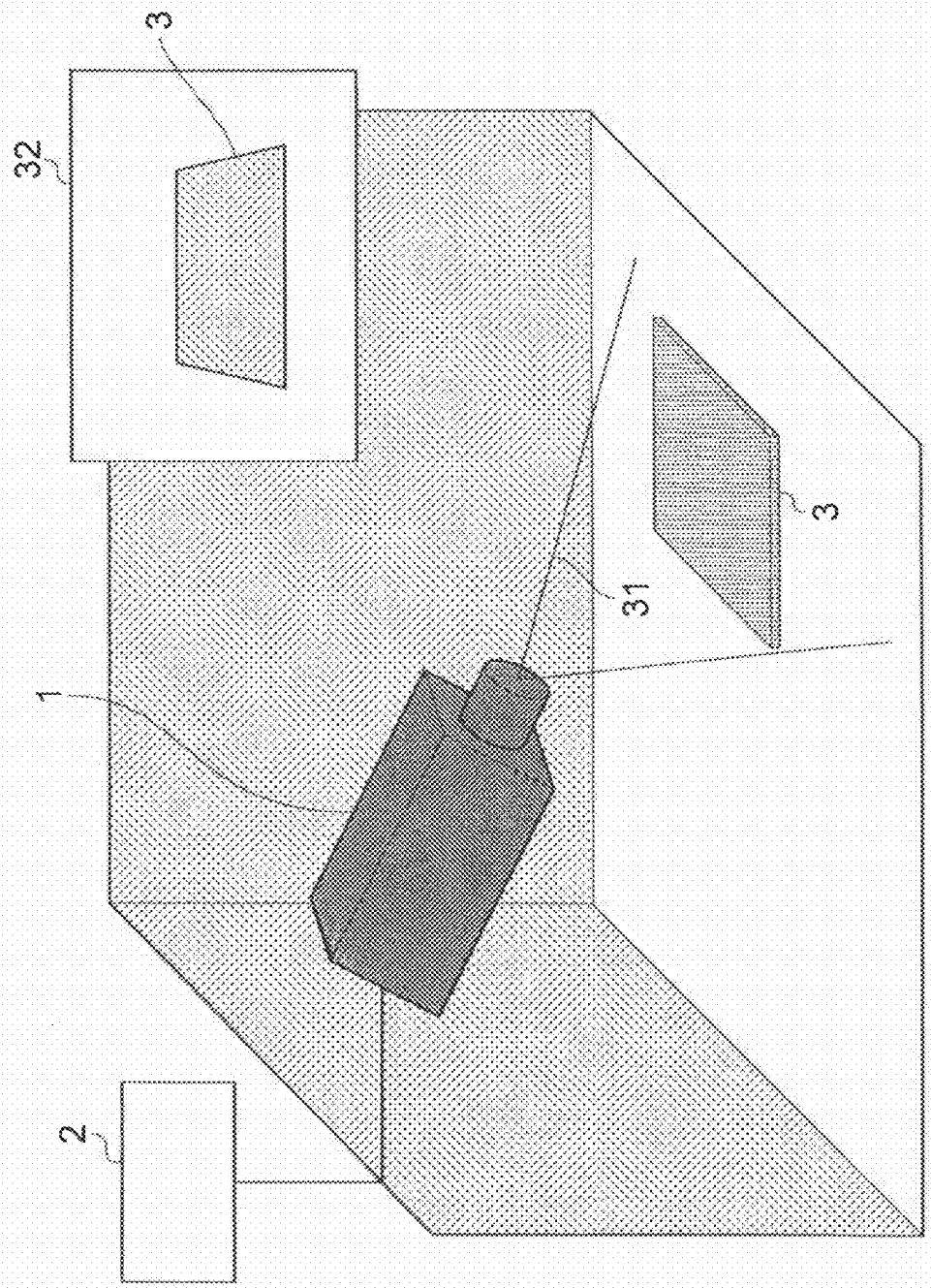
FIG. 3 provides a schematic diagram of the camera and image processor arranged in accordance with an example of the technique of determining camera parameters from a captured image including an illustration of the camera orientation field of view.

FIG. 3 shows the apparatus shown in FIGS. 1 and 2 with a representation of an image 32 captured by the camera 1 of the calibration surface 3 and processed by the image processor 2. As will be appreciated, the image 32 captured by the camera 1 is defined by the field of view 31 of the camera.

Figure 4:
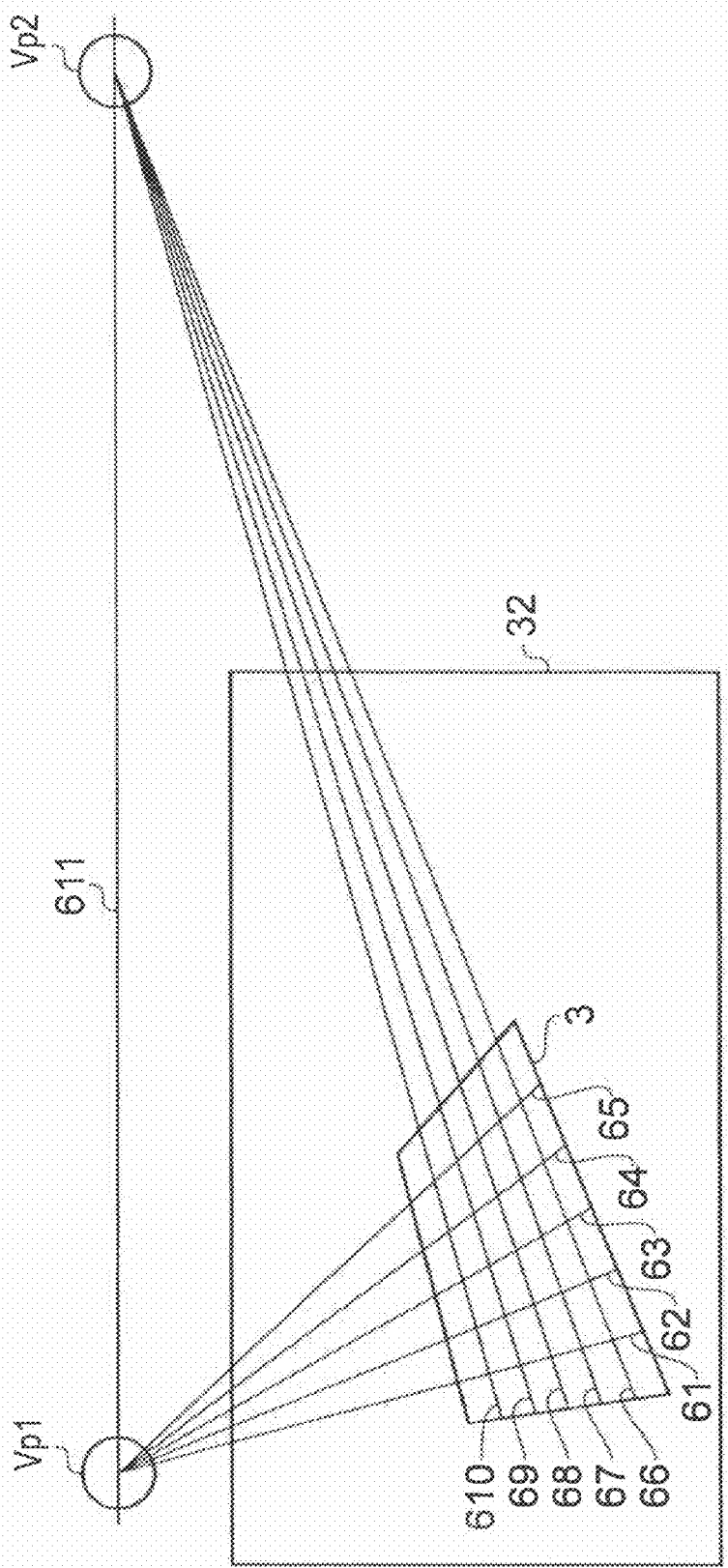
FIG. 4 provides a schematic diagram illustrating how vanishing points are constructed from a calibration pattern.

As mentioned above, the image processor 2 uses the captured image 32 provided by the camera 1 to estimate the orientation and position of the camera 1 relative to the calibration surface 3. In order to do this, the image processor 2 analyses the captured image data communicated to it by the camera 1. FIG. 4 shows an example of the captured image 32 received by the image processor 2 from the camera 1.

As can be seen from FIG. 4, the captured image 32 includes the calibration surface 3 on which is the calibration pattern. The size and position of the calibration surface relative to the captured image shown in FIG. 4 are not to scale and merely representative. As will be understood, the size of the calibration surface 3 with respect to the captured image will depend on a number of factors including the field of view of the camera 31, a value corresponding to the camera scale (S) (i.e. camera "zoom") and the distance of the camera from the calibration surface.

The calibration pattern is characterised such that it is detectable by the camera 1. Furthermore, the calibration pattern and the image processor 2 are arranged such that the image processor is able to detect from the image of the calibration pattern provided by the camera 1 at least a first and second group of lines. Both the first and second group of lines are parallel to the calibration surface 3. Furthermore, the first group of lines 61, 62, 63, 64, 65 and the second group of lines 66, 67, 68, 69, 610 are orthogonal to each other. As shown in FIG. 4, the image processor 2 is operable to extrapolate the lines from the first and second group to estimate a location (if such a location is present) of a first vanishing point Vp1 on the same two dimensional plane as the captured image 32, at which the extrapolated lines from the first group intersect and a second vanishing point Vp2 on the same two dimensional plane of the captured image at which the extrapolated lines from the second group of lines intersect. Vp1 and Vp2 are situated on a "horizon" line 611 which runs horizontally across the plane of the captured image 32. As is well known, two or more parallel lines viewed down their length will, from the perspective of a viewer, converge at a vanishing point on the horizon, the horizon being a line running across the viewer's field of view. As will be appreciated by considering the calibration surface 3 shown in FIG. 4, the position of the horizon line 611 and the position of the vanishing points Vp1 and Vp2 along the horizon line will vary depending on the orientation of the calibration surface 3. The present technique uses this phenomenon to determine the orientation of the camera 1 relative to the calibration surface 3.

In a further example, once the orientation of the camera 1 is known (i.e. the pitch angle, roll angle and yaw angle), the "real-world" position of the camera 1 (i.e. x, y and z coordinates with respect to the scene as captured by the camera) can be estimated by comparing the distance between two features on the calibration pattern within the captured image. This can be achieved providing the distance between the two features on the actual calibration surface is predetermined and known by the image processor 2.

As will be understood, the calibration pattern can be any suitable pattern from which the image processor can determine at least two groups of orthogonal parallel lines as described above.

In a further example, the image processor 2 is operable to use the estimated values for the position and orientation of the camera along with values representative of zoom or field of view to generate a composite image which includes a computer generated object combined with the captured image.

Because an estimated position and orientation of the camera 1 is known with respect to the calibration surface 3, the image processor has estimates of all the three dimensional information required to render a composite image which can accurately portray the position and orientation of the computer generated object with respect to the calibration surface. In the case of a computer generated object which is a representation of a three dimensional object, this means that the rendering of the computer generated object in the composite image can be positioned and orientated as if it were a real-life object. This is shown in FIG. 5.

Figure 5:
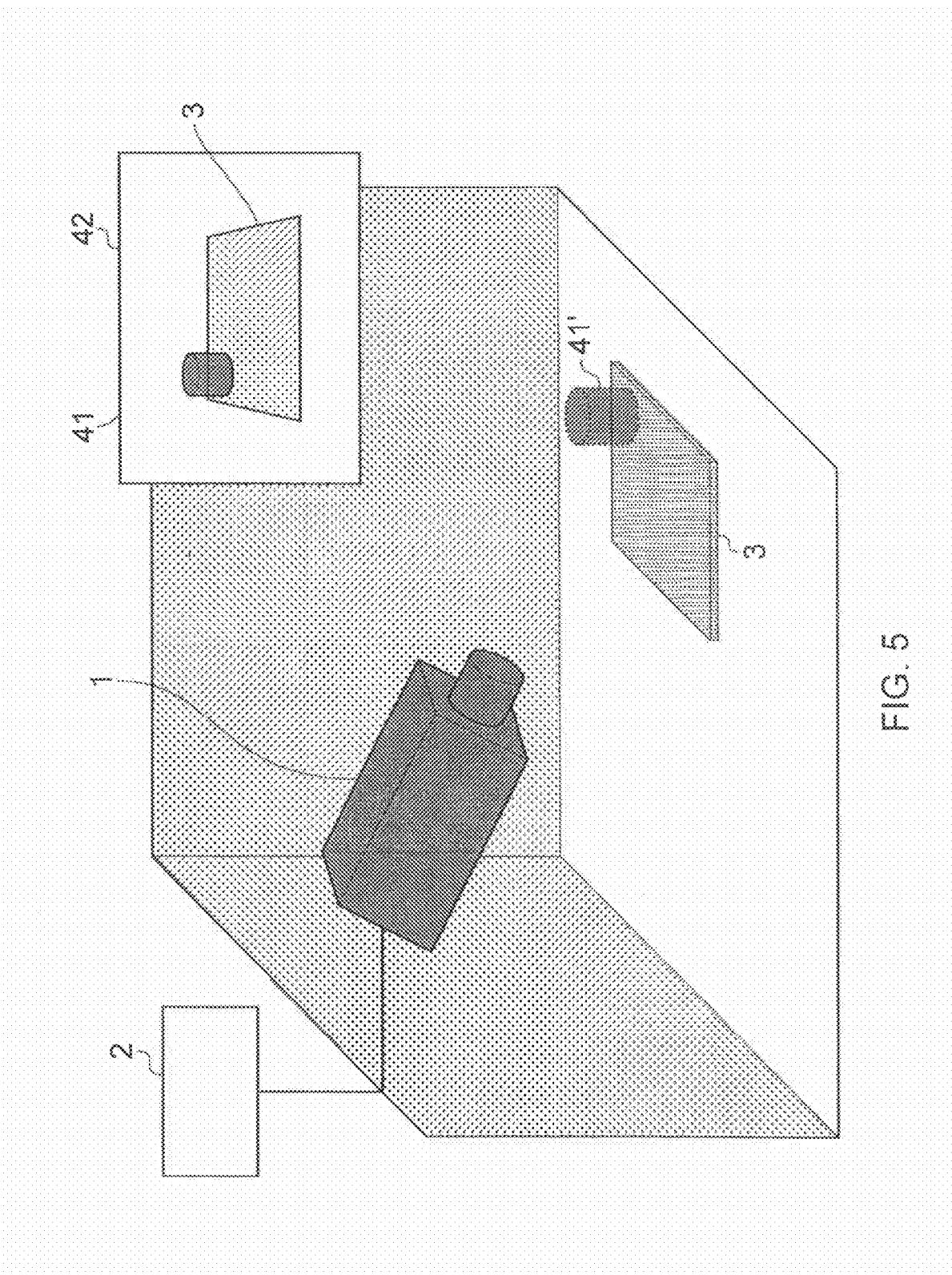
FIG. 5 provides a schematic diagram of the camera and image processor arranged in accordance with an example of the technique of determining camera parameters from the captured image including an illustration of a computer generated object.

FIG. 5 shows the apparatus shown in FIGS. 1 to 3 and also shows an example composite image 42, which is generated and output by the image processor. The output of the image processor may be to any suitable device such as a display monitor, a recording apparatus, a broadcast apparatus and so on. The composite image 4 includes a computer generated object 41. As explained above, the computer generated object 41 is based on a virtual object 41' which is to be "inserted" into the image captured by the camera 1. In the example shown in FIG. 5, the virtual object 41' is a simple three dimensional cylinder. However, it will be appreciated that the virtual object 41' can represent any suitable three dimensional object.

FIG. 5 illustrates the size, shape and position of the virtual object 41' relative to the calibration surface 3. As explained above, because the image processor 2 can estimate camera parameters corresponding to the position and orientation of the camera 1, the image processor 2 can generate the composite image 42 such that it can accurately display the computer generated object with respect to the calibration surface, taking into account the position and orientation of the camera 1. Therefore, should the orientation and/or position of the camera 1 change relative to the calibration surface 3, the computer generated object 41 can be displayed in the composite image 42 as if it were a real, three dimensional object. This is shown in FIG. 6.

Figure 6:
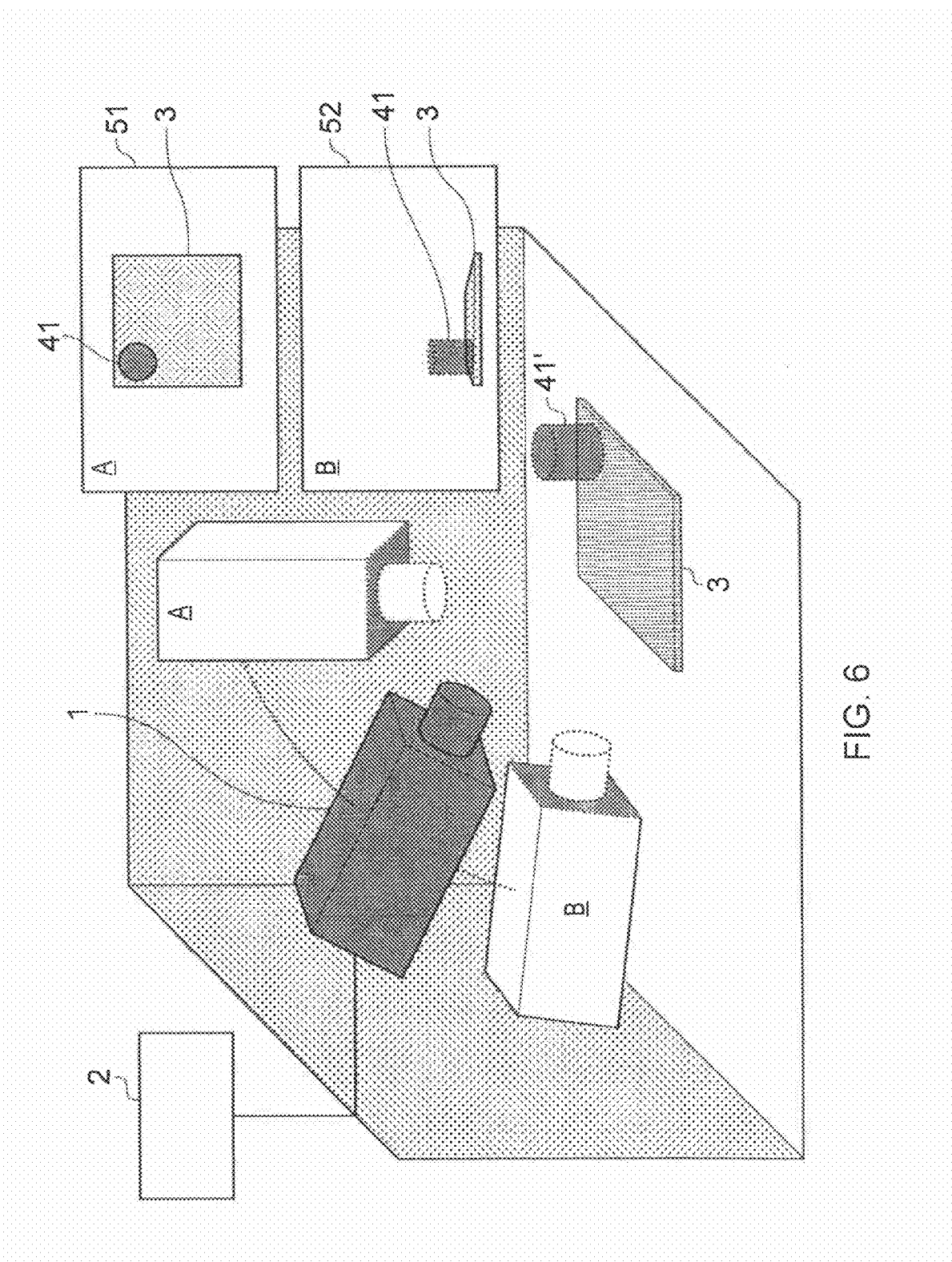
FIG. 6 provides a schematic diagram of the camera and image processor arranged in accordance with an example of the technique of determining camera parameters from the captured image including an illustration of the image processor rendering the computer generated object in accordance with estimated camera parameters.

FIG. 6 illustrates how the display of the computer generated object 41 in the composite image can change depending on the orientation and position of the camera as determined by the image processor 2. FIG. 6 shows the orientation and position of the camera 1 in two configurations, A and B. In configuration A, the x and y position and the pitch angle of the camera 1 have been changed such that the camera 1 is directly above the calibration surface 3 pointing down. As can be seen, a second composite image 51 is generated by the image processor which shows a corresponding change in the display of the computer generated object 41. Similarly in configuration B, the x and y position and the pitch angle of the camera 1 have been changed such that the camera 1 is almost on the same vertical plane as the calibration surface 3, almost pointing along the surface. A third composite image 52 is generated by the image processor which shows a corresponding change in the display of the computer generated object 41.

In one example the calibration pattern is a "checkerboard" pattern. The checkerboard is typically comprised of alternately coloured square tiles. However, any suitable pattern comprising alternately coloured elements which provide a corresponding plurality of corners at locations on the calibration pattern at which more than two of the coloured elements adjoin and which define a first and second group of lines, the lines in each of the group of lines being parallel with respect to each other and with respect to the calibration surface and the first group of lines being orthogonal to the second group of lines can be used.

It will be understood that "coloured" refers to any light reflecting property of the elements which makes them distinguishable from each other by the image processor. This includes black and white.

The following describes the theory and application of a number of processes that can be undertaken in the image processor 2 to determine the position and orientation of the camera 1 when the calibration pattern is a checkerboard pattern. As described above, the camera 1 captures an image of the calibration surface on which is the checkerboard pattern. The captured image of the checkerboard is then communicated to the image processor. In one example the image processor includes a Cell processor.

Checkerboard Calibration Pattern

A checkerboard calibration pattern allows detection of a pattern of corners or lines with known relationships to each other. Each corner or line can be equally well defined, and other detail elsewhere in the captured image taken by the camera can be eliminated from false detections as they would not conform to an expected shape and pattern associated with the checkerboard pattern.

Whilst the checkerboard calibration pattern is only, in effect, a two dimensional object, this is sufficient for determining all the camera parameters, if some basic and reasonable assumptions about the camera are made (i.e. that camera pixels are square, an optical centre of the captured image is at the centre of the captured image, and there is no skew in the captured image, or lens distortion in the camera 1). Based on these assumptions, detection of four corners of "real-world" locations on the calibration surface should be sufficient (in an ideal situation where the measurements are 100% accurate) to determine the position and orientation of the camera. However, the more corners that are detected, the greater the level of redundant information, and therefore the greater the accuracy that the position and orientation parameters can be estimated with (not least because false or misleading data can be eliminated or reduced).

As set out above, the parameters that are to be found are as follows:

1. the camera pitch angle 21
2. the camera yaw angle 23
3. the camera roll angle 22
4. the camera alpha 31 (perspective/field-of-view)
5. "real-world" camera x location
6. "real-world" camera y location
7. "real-world" camera z location This is a total of seven unknowns: hence the assertion above that four detected points is the theoretical minimum (each point contributing two equations from the two dimensional x and y coordinates of the captured image).

A camera matrix equation can be expressed as follows:

$$[ScreenLocation] = [ProjectionMatrix][ViewMatrix][WorldLocation]$$

$$\text{Where: } [ViewMatrix] = [Rz][Rx][Ry][Tc] \qquad \text{Eq 2-1}$$

$$[ScreenLocation] = [X_s W_s \; Y_s W_s \; Z_s W_s \; W_s]^T \qquad \text{Eq 2-2}$$

$$[ProjectionMatrix] = \begin{bmatrix} \alpha & 0 & 0 & 0 \\ 0 & \gamma\alpha & 0 & 0 \\ 0 & 0 & \frac{zNear+zFar}{zNear-zFar} & \frac{2*zFar*zNear}{zNear+zFar} \\ 0 & 0 & -1 & 0 \end{bmatrix} \qquad \text{Eq 2-3}$$

$$\alpha = \cot(fovx/2) \qquad \text{Eq 2-4}$$
$$fovx = \text{Field of view } (x) \text{ angle}$$

$$\gamma = aspectRatio$$
$$= screenWidth/screenHeight$$

$$\begin{bmatrix} \text{if the screen coordinates are normalised and} \\ \text{expressed as square pixels, i.e. screen} \\ \text{coordinates go from } (-1, -1/\gamma) \text{ to } (1, 1/\gamma) \\ \text{then this can be removed from the matrix} \end{bmatrix}$$

$$[Rz] = \begin{bmatrix} \cos\theta_z & \sin\theta_z & 0 & 0 \\ -\sin\theta_z & \cos\theta_z & 0 & 0 \\ 0 & 0 & 1 & 0 \\ 0 & 0 & 0 & 1 \end{bmatrix} (\theta_z = \text{Roll angle})$$

$$[Rx] = \begin{bmatrix} 1 & 0 & 0 & 0 \\ 0 & \cos\theta_x & \sin\theta_x & 0 \\ 0 & -\sin\theta_x & \cos\theta_x & 0 \\ 0 & 0 & 0 & 1 \end{bmatrix} (\theta_x = \text{Pitch angle}) \qquad \text{Eq 2-5}$$

$$[Ry] = \begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix} (\theta_y = \text{Yaw angle}) \qquad \text{Eq 2-6}$$

$$[Tc] = \begin{bmatrix} 1 & 0 & 0 & -Cx \\ 0 & 1 & 0 & -Cy \\ 0 & 0 & 1 & -Cz \\ 0 & 0 & 0 & 1 \end{bmatrix} \qquad \text{Eq 2-7}$$

$(Cx, Cy, Cz)$ is the camera location in world space  Eq 2-8

$$[\text{World Location}] = [x, y, z, l]^T$$

N.B. The terms "screen" and "captured image" are used interchangeably, i.e. reference to a location/coordinate on a screen refers to a location/coordinate of the captured image.

With normalised screen coordinates, (i.e. screen coordinates, corresponding to coordinates of the captured image, go from $(-1, -1/\gamma)$ to $(1, 1/\gamma)$), and the Z screen coordinate removed (as there is no way of measuring it) this can be reduced to:

$$[ScreenLocation] = [MVPMatrix][WorldLocation]$$

$$[MVPMatrix] = \begin{bmatrix} \alpha(\cos\theta y\cos\theta z + \sin\theta x\sin\theta y\sin\theta z) & \alpha\cos\theta x\sin\theta z & \alpha(-\sin\theta y\cos\theta z + \sin\theta x\cos\theta y\sin\theta z) & SO_x \\ \alpha(-\cos\theta y\sin\theta z + \sin\theta x\sin\theta y\cos\theta z) & \alpha\cos\theta x\cos\theta z & \alpha(\sin\theta y\sin\theta z + \sin\theta x\cos\theta y\cos\theta z) & SO_y \\ -\cos\theta x\sin\theta y & \sin\theta x & -\cos\theta x\cos\theta y & S \end{bmatrix}$$

Eq 2-9

Where: $\begin{bmatrix} SO_x \\ SO_y \\ S \end{bmatrix} = \begin{bmatrix} \alpha & 0 & 0 & 0 \\ 0 & \alpha & 0 & 0 \\ 0 & 0 & -1 & 0 \end{bmatrix} [Rz][Rx][Ry] \begin{bmatrix} -Cx \\ -Cy \\ -Cz \\ 1 \end{bmatrix}$ Eq 2-10

$[O_x, O_y]$ = location of world coordinate origin on screen $S$ = Camera Scale

= distance of camera from world coordinate origin

Eq 2-11

The screen location derived here is of the form:

$$[X_s W_s, Y_s W_s, W_s]^T.$$

Therefore, $X_s$ and $Y_s$ are known and $W_s$ is unknown.

For the purposes of simplification, it can be assumed that the origin of the real-world coordinates (i.e. the three dimensional space occupied by the camera) is at the centre of the checkerboard, and that each square has a width of 1.0 (the units are arbitrary). The x and z axes are defined as flat on the board, parallel to the edges of the squares, and therefore the y axis points perpendicularly up out of the centre of the board. This is shown in FIG. 7.

Figure 7:
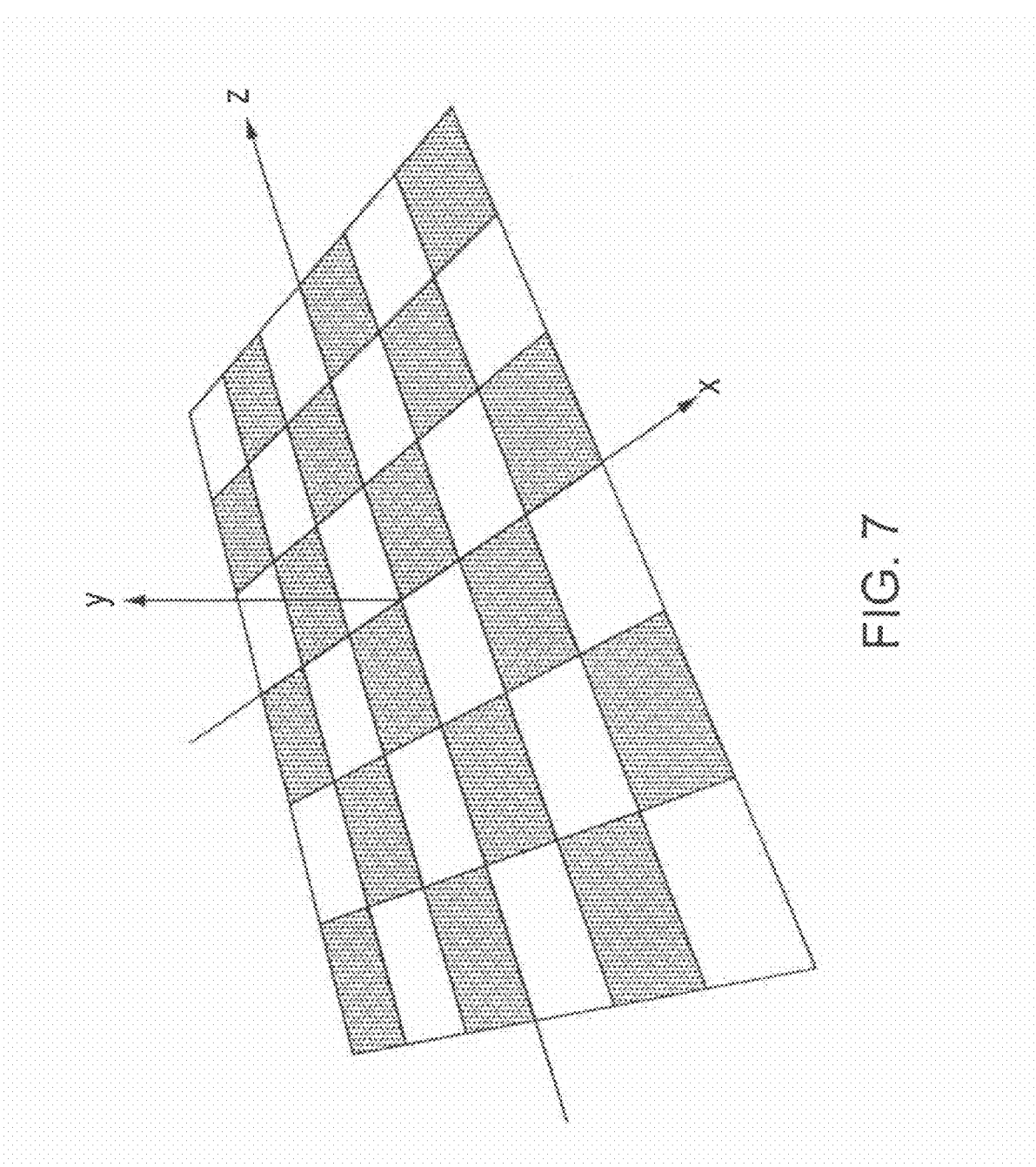
FIG. 7 shows a schematic diagram of the axis defined for a checkerboard calibration pattern.

As a consequence of the coordinate system shown in FIG. 7, all corners on the checkerboard have world coordinates with y=0, and integer x and z coordinates.

In general then, for a checkerboard corner at world coordinates (x, 0, z), the screen coordinates can be expressed as follows:

$$X_s = \frac{\alpha x(\cos\theta y\cos\theta z + \sin\theta x\sin\theta y\sin\theta z) + \alpha z(-\sin\theta y\cos\theta z + \sin\theta x\cos\theta y\sin\theta z) + SOx}{-x\cos\theta x\sin\theta y - z\cos\theta x\cos\theta y + S}$$

Eq 2-12

$$Y_s = \frac{\alpha x(-\cos\theta y\sin\theta z + \sin\theta x\sin\theta y\cos\theta z) + \alpha z(\sin\theta y\sin\theta z + \sin\theta x\cos\theta y\cos\theta z) + SOy}{-x\cos\theta x\sin\theta y - z\cos\theta x\cos\theta y + S}$$

Eq 2-13

A first step towards calculating the camera orientation and position parameters is to find the checkerboard corners on the captured image. As will be understood, the corners are the locations on the checker board where four alternately coloured tiles meet. The requirements for a checkerboard corner detection algorithm include:

1. Finding a junction of four squares: two "dark" squares diagonally opposite to each other; and two "light" squares in remaining two positions
2. Detecting a corner only at a pixel of the captured image nearest to the corner, then refining to sub-pixel accuracy
3. Eliminating false positive detections (especially those not on the calibration surface at all)
4. Working with most reasonable orientations of the camera/calibration surface
5. In some examples of the present technique the captured image should be manipulated such that the checkerboard pattern covers more than about one third of the height of the captured image. Therefore in some examples the corners should be more than about 40 pixels apart from each other, if the captured image is in the format of 1920×1080 video output.
6. The corner detector should be able to accommodate changes in lighting conditions across the board (i.e. look at differences in luminance/chrominance levels, rather than absolutes)
7. For operation on a Cell processor, the corner detector should be able to complete its detection and confirmation of all corners in a single synergistic processing unit (SPU) within one processing frame (i.e. less than 33 ms).

In order to implement the above requirements in the image processor, two pre-processing steps can be undertaken.

In the first pre-processing step, in the case where the captured image output from the camera 1 is in the form of a progressive segmented frame (PsF) video output, the PsF incoming video is converted into a single progressive frame (simply by re-interleaving the lines). If the image processor 2 is a Cell processor, this is undertaken by an SPU program which can also filter the video to produce lower resolution MipMaps of ½, ¼ and ⅛ the width and height. The full size and MipMap versions can also be used for rendering the video elsewhere in the apparatus.

As mentioned above, the "dark" and "light" squares of the checkerboard may not necessarily be black and white. Therefore, to cater for the case in which a checkerboard has a change of chrominance, and a lower change of luminance, between the two squares, a second pre-processing step can be undertaken. Again, if the image processor is a Cell processor, this step can be conducted as a SPU program. The process takes in two approximate colours of the "dark" (minCol) and "light" (maxCol) squares (these should ideally be set by the user at initialisation).

minMaxVector=maxCol−minCol;

gain=1.8/length(minMaxVector);

minMaxVector*=gain;

Output=dotProduct(inputVideoVec,minMaxVector)

The Output is then limited to the range 0−>1 (an SPU function can convert the input 8-bit fixed point data to floating point).

If the minCol and maxCol are set to black and white respectively, then the output is simply the luminance data.

In the first stage of the checkerboard corner detection process, a low resolution version of the captured image is processed. In the case where the captured image is part of a video output this may be ⅛th width and height, for example, 240× 135 pixels. During this first stage, the entire captured image is processed to detect possible checkerboard corners. A threshold is set so as to flag all possible corners, many of which will be false positives which can be removed later. Processing the captured image at low resolution has two benefits:

1. The entire captured image can be searched much more quickly than at full resolution (containing, for example, only ¹⁄₆₄th of the number of pixels)

2. Many false positives that might be found in non-board calibration surface locations (or other parts of the checkerboard) are inherently filtered out in creating the low-resolution video. Checkerboard squares will appear roughly identical at low and full resolution; most false positives will not.

Figure 8A:
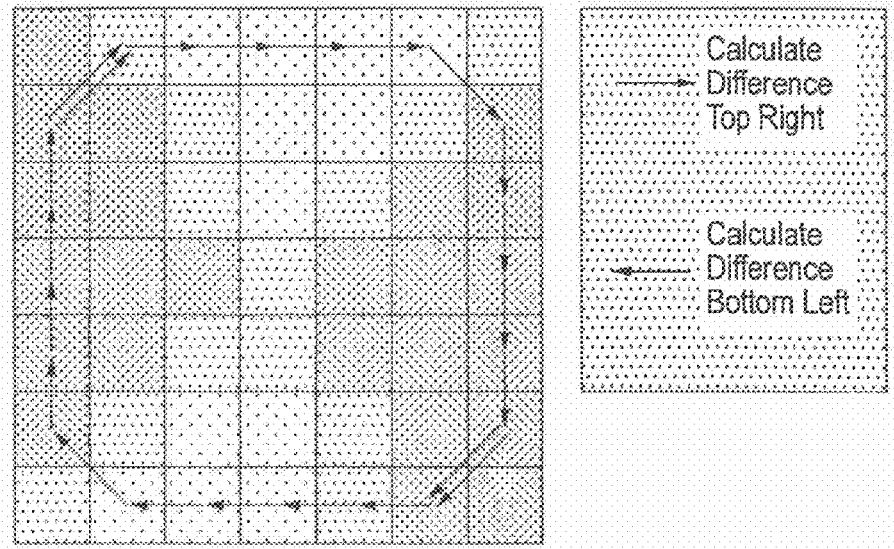
FIGS. 8a and 8b illustrates part of a process for identifying a checkerboard corner.

Initially during corner detection, each pixel in the low resolution version of the captured image is analysed. A 7×7 pixel square around the pixel being currently analysed is examined. The differences between adjacent pixels is calculated following a path around the outside of the 7×7 square. This is shown in FIG. 8a.

Figure 8B:
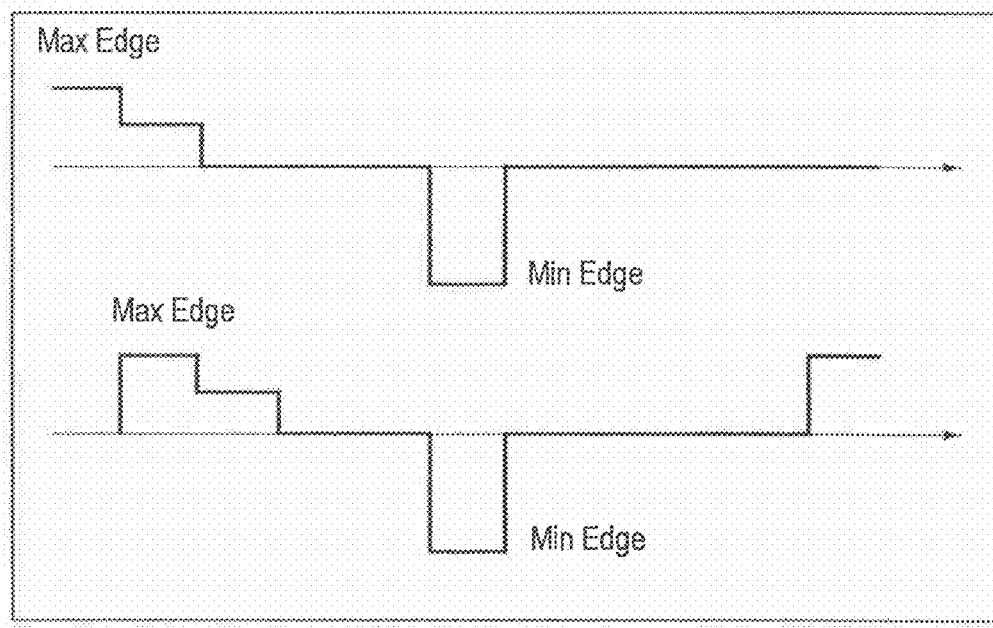

Two sets of edge differences are identified: the top right half, and the bottom left half (with a repeated pixel at the end to allow some overlap between the two halves). This is shown in FIG. 8b. The two sets of edge differences are then assessed in view of the following criteria to make an initial determination as to whether or not the pixel being analysed corresponds to a corner on the checkerboard.

1. The maximum (most positive) edges are in approximately the same locations.
2. The minimum (most negative) edges are in approximately the same locations.
3. The maximum and minimum edges are separated from each other.
4. Both the maximum and minimum edges have a reasonable magnitude.

If all these conditions are met, then a potential corner is identified and flagged with a probability score.

The detection procedure can result in adjacent pixels being flagged as possible corners. In this case the following two stages can be undertaken to remove the duplication.

The first stage involves processing a 5×5 group of pixels of the output of the above corner detection process and finding the centre of gravity of the group. All relevant pixels are processed. The output is a list of possible corners and their (full resolution) coordinates in screen (i.e. captured image) space.

The second stage simply processes the possible corner coordinates on the captured image and removes all those whose coordinates are less than a threshold distance (e.g. 16 pixels) away from a previous corner.

The above low resolution procedure is repeated with a full resolution version of the captured image. However, instead of processing the entire captured image, a section reduced in size, for example a 32×32 pixel square cut-out section surrounding each possible corner (as detected at low resolution) is processed.

It is still possible that even after both the low and high resolution processes have been undertaken some of the detected corners are actually false positives. In particular, narrow lines on the checkerboard (or elsewhere) can be detected as corners as the pattern of edges around a 7×7 square may be similar to that of a real corner. This is illustrated in FIG. 9.

To remove such false corners, a procedure similar to the low and high resolution procedure is applied, only over a greater distance from the centre pixel.

For example a 64×64 pixel square cut-out around each corner is processed, and two circles around the centre pixel analysed. A smaller circle may for example have a radius of 8 pixels and a larger circle may have a radius of, for example, 26 pixels. The most positive and most negative edges around these circles are compared in location, as well as between the smaller and larger radii. Also, the number of pixels above and below a midlevel grey-level are counted: the fractions above and below should be similar for the two radii. The various criteria are combined into an overall confidence level for the corner. Only those corners with a high level of confidence are retained. As will be understood, this processing stage reduces the number of false positive corners whilst minimising the number of genuine corners that are removed.

Once the corners have been processed as described above to reduce the number of false positives, all confirmed corners are processed to find their coordinates to greater than pixel accuracy. This is achieved for example, using the same 64×64 square cut-outs as used during the confirmation process. Also, similarly to above, this stage uses a circle around the approximate corner location with a radius of, in one example, 26 pixels.

Figure 10:
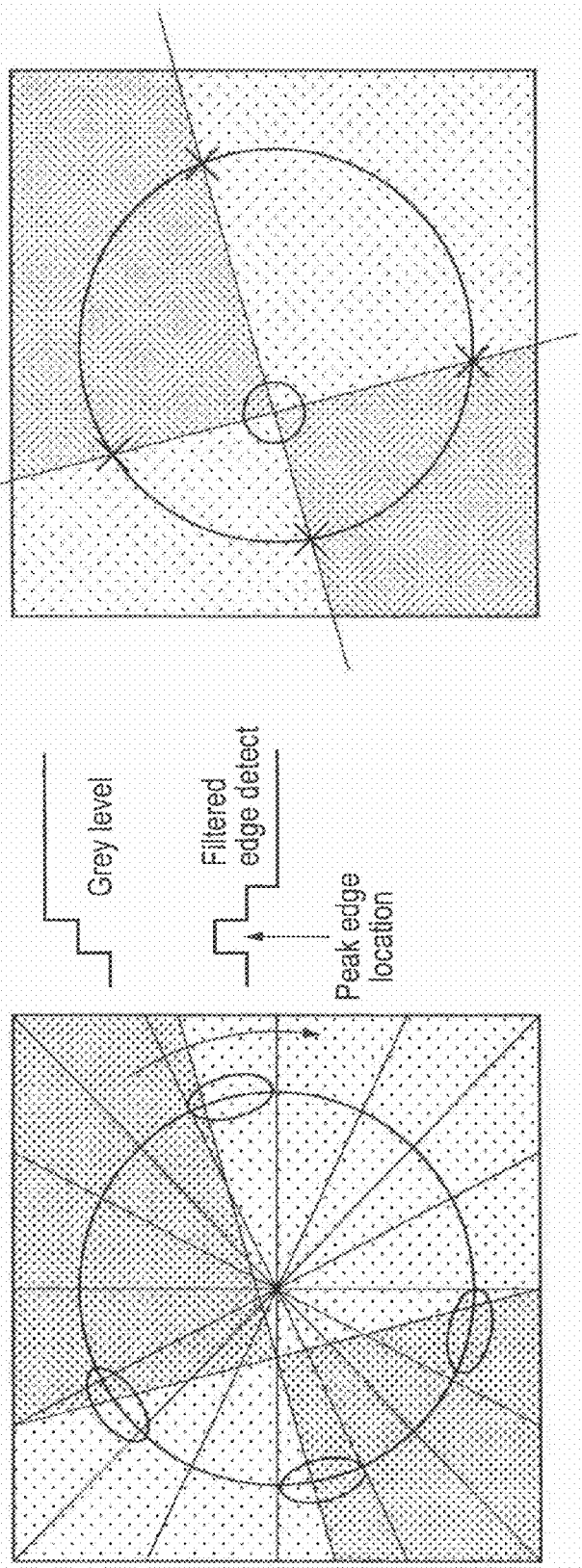
FIG. 10 illustrates part of a technique for finding the corners of the checkerboard.

Firstly, the approximate coarse locations of the two positive and negative edges around the circumference of the circle must be found. Finer samples are then taken, low pass filtered, and their peak edges found, to find more accurate positions of the edges on the circumference. The accurate corner location is then calculated from the intersection of the two lines joining the positive and negative edges. This process is illustrated in FIG. 10.

During the corner detection process, lines joining the detected corners are constructed. The lines which run through the largest numbers of corners are then identified. The image processor identifies every possible line joining each confirmed corner to every other confirmed corner. Therefore for example, if 49 corners (the theoretical maximum number of internal corners on an 8×8 checkerboard) are detected, then there are 49×48 (2352) possible lines. However, as each line is constructed, it is compared against all lines so far constructed. If the line closely matches an already-constructed line, then that already-constructed line has a count value incremented.

Figure 11:
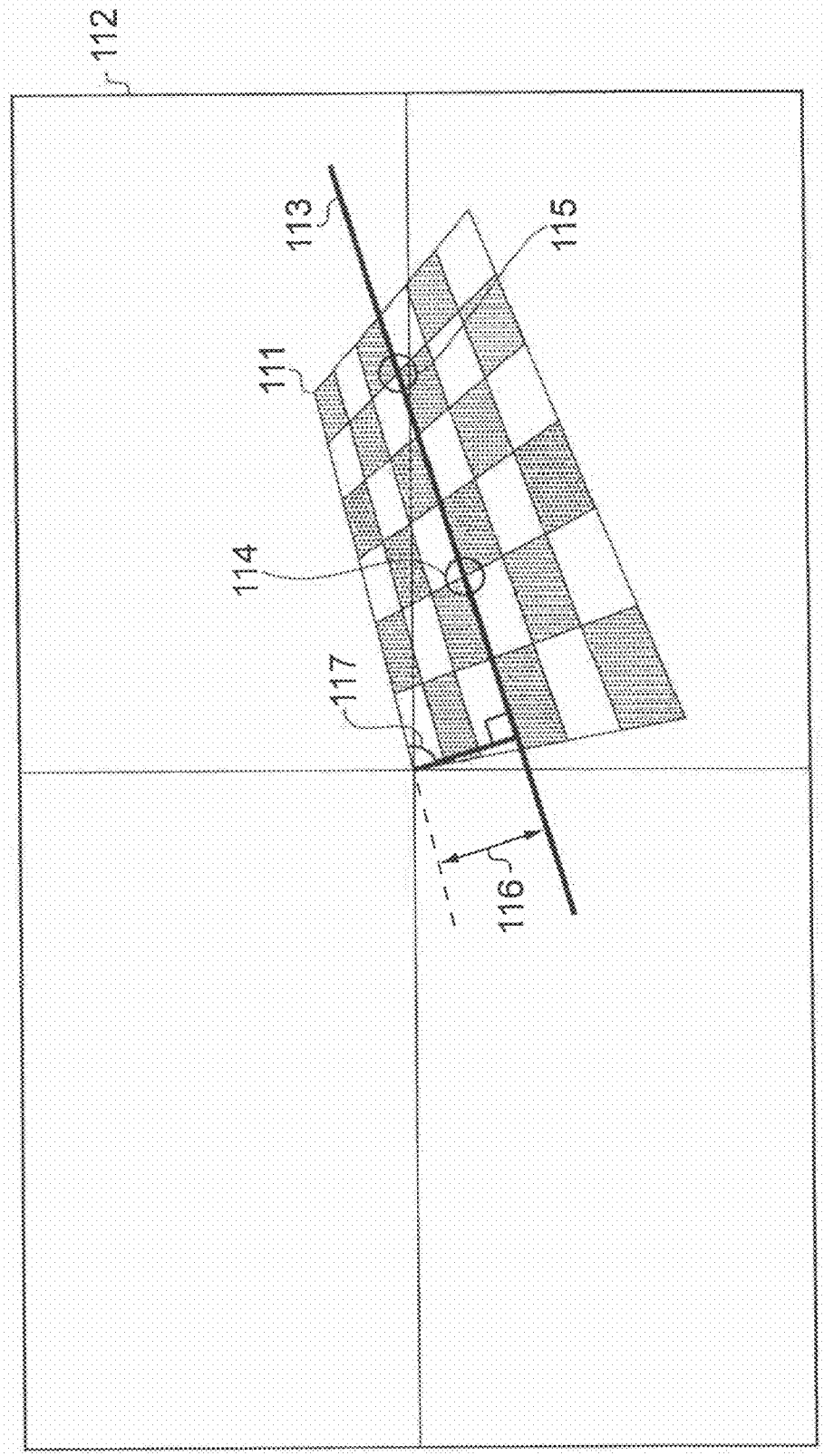
FIG. 11 shows a representation of a line identified on the checkerboard calibration pattern.

In some examples of the present technique, the lines used are defined in polar coordinates (with a radius and angle), rather than Cartesian coordinates (with a gradient and intercept). This is shown in FIG. 11 which shows the calibration pattern 111 as seen on the captured image 112. As can be seen a line 113 is constructed between two identified corners 114, 115. The line 113 can be defined with respect to the captured image 112 with a radius 116 and an angle 117. This makes comparisons more consistent. In polar coordinates the line 113 can be said to match another if the angles 117 are within for example 2 degrees and their radii 116 are within for example, 6 pixels of each other. With Cartesian coordinates, comparing the gradients cannot be done by a simple absolute difference as the gradient difference will be very large for near-vertical lines, but very small for near-horizontal ones.

The lines with the highest count values (effectively those with the most detected corners that lie on them) are found. For an 8×8 checkerboard, there should be at most seven detected corners on a line, whether the line runs parallel to the edges of the squares, or at a 45 degree diagonal.

For each line, once the average radius and angle (i.e. polar coordinate on the captured image) are established, a line of best fit is constructed through all the identified corners on that line. The line of best fit searches between the minimum and maximum radii and angles to find the line that has the smallest sum of the distances between each point and the line. In other words:

Line of best fit finds (r,θ) that minimise:

$$\sum_{i=0}^{n} \text{abs}(y_i\cos\theta - x_i\sin\theta - r) \qquad \text{Eq 4-1}$$

for n points on the line.

The lines with the greatest count values will include a mixture of those parallel to the edges of the squares of the checkerboard (from now called horizontal/vertical, or HN, for simplification), those at a 45 degree diagonal, and other diagonals. These need to be sorted into groups that are organised depending on whether they are parallel in real-world space (i.e. relative to the calibration surface). In other words, there should be a horizontal group, a vertical group and a group for each of the two 45 degree diagonals. This is shown in FIG. 12a and FIG. 12b. FIG. 12b shows a group of horizontal lines 123 and a group of vertical lines 124. FIG. 12a shows a first and second group of lines 121, 122 which are at 45 degrees to the horizontal group of lines 123 and the vertical group of lines 124.

There may also be other groups of lines for other diagonals. These groups will generally contain lines of a similar angle, but differing radius.

A first step towards sorting the lines into groups is to sort the lines into ascending order of angle. Typically, the difference in angle between any two lines in the same group will increase as the difference in radii increases.

The first line is assigned to group 0: this group is then initialised with a "group angle" and "group radius" equal to those of the first line. Then each subsequent line is compared to all the groups defined so far. If the line's angle is similar to a group angle (the exact amount of difference permitted can be dependent on the difference in radius) then the line is assigned to that group. The group angles and radius are updated as an average of all the lines in the group. It is possible for a group to be spread around an angle of zero. In this case, line angles of almost 360 degrees must be considered as (angle−360) degrees.

As described above, the vanishing points (points of intersection) of the line groups can be used to determine the orientation of the camera relative to world coordinates (i.e. the calibration surface), independently of the camera location. They can also be used to determine the alpha/perspective 31 of the camera 1.

As discussed above, vanishing points are the coordinates on the same plane as the captured image where lines which are parallel in real-world space intersect. They therefore represent a location on the captured image of a point at infinity in world space (as parallel lines can only meet at infinity).

This can be represented by using a real-world coordinate with a homogeneous element of zero: i.e. actual real-world position of (x/w, y/w, z/w) is at infinity. For instance, the vanishing point of the real-world x-axis can be expressed as (1, 0, 0, 0) in real-world coordinates.

As it is already known that the following applies:

[Screen location]=[MVP Matrix][World location]    (Eq 2-1)

It can be seen that for the x- and z-direction vanishing points, the following is also true:

$$\begin{bmatrix} x_{vpx}w_{vpx} & x_{vpz}w_{vpz} \\ y_{vpx}w_{vpx} & y_{vpz}w_{vpz} \\ w_{vpx} & w_{vpz} \end{bmatrix} = [MVP \text{ Matrix}] \begin{bmatrix} 1 & 0 \\ 0 & 0 \\ 0 & 1 \\ 0 & 0 \end{bmatrix} \qquad \text{Eq 5-1}$$

It can therefore be seen that the $1^{st}$ and $3^{rd}$ columns of the MVP matrix represent the screen locations of the vanishing points for the x- and z-directions respectively.

Therefore:

$$x_{vpx} = \frac{\alpha(\cos\theta y\cos\theta z + \sin\theta x\sin\theta y\sin\theta z)}{-\cos\theta x\sin\theta y} \qquad \text{Eqs 5-2}$$

$$y_{vpx} = \frac{\alpha(-\cos\theta y\sin\theta z + \sin\theta x\sin\theta y\cos\theta z)}{-\cos\theta x\sin\theta y}$$

$$x_{vpz} = \frac{\alpha(-\sin\theta y\cos\theta z + \sin\theta x\cos\theta y\sin\theta z)}{-\cos\theta x\cos\theta y}$$

$$y_{vpz} = \frac{\alpha(\sin\theta y\sin\theta z + \sin\theta x\cos\theta y\cos\theta z)}{-\cos\theta x\cos\theta y}$$

From the above equations it can be derived that the line joining the two vanishing points (and indeed, any vanishing points on the x z-plane) has a gradient dependent only on the roll angle ($\theta_z$):

$$\frac{y_{vpz} - y_{vpx}}{x_{vpz} - x_{vpx}} = -\tan\theta z \qquad \text{Eqs 5-3}$$

Once the roll angle ($\theta_z$) has been found, the following equations can be derived from the vanishing points for the yaw angle θy, and the pitch angle θx:

$$\tan^2\theta y = \frac{\left(\tan\theta z + \frac{y_{vpx}}{x_{vpx}}\right)\left(\frac{y_{vpx}}{x_{vpx}}\tan\theta z - 1\right)}{\left(1 - \frac{y_{vpx}}{x_{vpx}}\tan\theta z\right)\left(\tan\theta z + \frac{y_{vpz}}{x_{vpz}}\right)} \qquad \text{Eqs 5-4}$$

$$\sin\theta x = \frac{\tan\theta y\left(\frac{y_{vpz}}{x_{vpz}} + \tan\theta z\right)}{\left(\frac{y_{vpz}}{x_{vpz}}\tan\theta z - 1\right)}$$

the camera perspective 31 can then be found from any of the vanishing point coordinates.

The 45 degree diagonal line groups 121, 122 can also be used as sources of vanishing points, in place of the horizontal/vertical line groups 123, 124. As long as two orthogonal line groups are used either pair of vanishing points are equally effective.

The results obtained by the 45 degree diagonal line groups 121, 122 will be identical to those found using the horizontal/vertical line groups 123, 124, with the exception that the yaw angle ($\theta_y$) will differ by 45 degrees. As will be explained later, the 90-degree quadrant in which the yaw angle falls is determined by a later step. For now it is sufficient to say that:

If using 45-degree diagonal vanishing points:

$\theta_y += 45$ degrees ($\pi/4$ in radians)

If all the checkerboard corners are detected, or an even distribution of the corners across the checkerboard are detected, then a "world origin" can be estimated as a nearest corner to the middle of the distribution of corners.

If part of the board is undetected, or at certain extreme orientations, this may give the wrong corner (especially if the central corner is itself undetected), so this estimate may need to be checked, and if necessary corrected, at a later stage.

A value for a camera scale (S) can be found from the distance between two adjacent corners. If the origin location has been found, then the location of a corner one unit away, e.g. (1, 0, 0), is the simplest way of estimating the camera scale. For an initial approximate estimate, assuming the distance from the camera to the origin much greater than the distance between two corners, if the estimated origin corner is not the correct origin corner, the resulting camera scale should be close enough, but will be refined later.

For a corner at world coordinate $(x, 0, 0)$:  Eqs 5-5

$$\frac{S}{x} = \frac{\alpha\cos\theta y\cos\theta z + \alpha\sin\theta x\sin\theta y\sin\theta z + X_s\cos\theta x\sin\theta y}{X_s - O_x}$$

$$\frac{S}{x} = \frac{-\alpha\cos\theta y\sin\theta z + \alpha\sin\theta x\sin\theta y\cos\theta z + Y_s\cos\theta x\sin\theta y}{Y_s - O_y}$$

Where:

$(X_s, Y_s)$ = screen coordinate of new corner $(O_x, O_y)$ = screen coordinate of origin corner Similarly, for a corner at world coordinate $(0, 0, z)$:

$$\frac{S}{z} = \frac{-\alpha\sin\theta y\cos\theta z + \alpha\sin\theta x\cos\theta y\sin\theta z + X_s\cos\theta x\cos\theta y}{X_s - O_x}$$  Eqs 5-6

$$\frac{S}{z} = \frac{\alpha\cos\theta y\sin\theta z + \alpha\sin\theta x\cos\theta y\cos\theta z + Y_s\cos\theta x\cos\theta y}{Y_s - O_y}$$

From Equation 2-11:

$$\begin{bmatrix} SO_x \\ SO_y \\ S \end{bmatrix} = \begin{bmatrix} \alpha & 0 & 0 & 0 \\ 0 & \alpha & 0 & 0 \\ 0 & 0 & -1 & 0 \end{bmatrix}[Rz][Rx][Ry]\begin{bmatrix} -Cx \\ -Cy \\ -Cz \\ 1 \end{bmatrix}$$  (Eq 2-11)

From which it can be derived that the camera location in world space is:

$$\begin{bmatrix} Cx \\ Cy \\ Cz \end{bmatrix} = [Ry]^{-1}_{3\times3}[Rx]^{-1}_{3\times3}[Rz]^{-1}_{3\times3}\begin{bmatrix} -SO_x/\alpha \\ -SO_y/\alpha \\ S \end{bmatrix}$$  Eq 5-7

Where Cx, Cy and Cz are equivalent to x, y and z, i.e. the position of the camera 1 with respect to the calibration surface All the camera parameters necessary to construct the View Matrix and Projection Matrix to enable rendering of computer generated objects in the same three dimensional space as the calibration surface are now known.

The remaining parameters used for the projection matrix (zNear and zFar) are arbitrary: they determine the scaling of the depth buffer used for rendering. For example the values used can be:

zNear=1.0 f;

zFar=100.0 f;

As will be understood, there may be some error in the measurements of the corner locations. Furthermore, it is possible that more than four corners are detected on the checkerboard and there may be redundant information. It may therefore be desirable to provide a way to best combine the results to generate the most accurate and reliable results.

At several stages in the process, therefore, there are steps to accommodate for any possibly conflicting results. For example, as described above, the lines drawn between the corner points of the checkerboard are constructed using a line of best fit method. This reduces some of the inaccuracy due to corner coordinate measurement. However, it is still possible that the lines within each group will not all intersect at exactly the same point. In fact, small errors in the line angle 117 or radius 116 can lead to very large difference in the intersection location (vanishing point), as the lines can be close to parallel on the screen. It is also possible that the line group may contain lines that do not belong in that group: for instance, non-45 degree diagonal lines that are close in orientation to the rest of the group, but do not actually belong in that group. In such cases, intersections with other lines in the group are likely to be within the area of the checkerboard, so can be immediately eliminated.

In order to further attend to any conflicting results, the x and y coordinates on the captured image of all the possible intersections within a group are calculated. Intersections within the checkerboard are first eliminated. Then a weighted average of all the x and y values for the intersections is made. Each intersection is weighted according to the difference between the angles of the two lines that form the intersection. This is because the calculated intersection of two almost parallel lines will be extremely sensitive to errors in each line. If the lines are less similar in angle, then the intersection is more reliable.

In general, the direction (i.e. angle in polar coordinates) of the vanishing points can be found reasonably accurately.

It is possible that the line groups may have been formed incorrectly, and that two calculated vanishing points both represent the same actual vanishing point. Therefore a step is included that combines similar vanishing points.

Each vanishing point is assigned a "confidence" value that is calculated as the sum of the angle differences for each intersection. Therefore vanishing points from line groups that are almost parallel (or in fact, absolutely parallel) will have a low confidence value because they lead to a distant and possibly inaccurate vanishing point. Vanishing points from line groups with diverse angles will have a high confidence value. If all the lines in a group are very close to parallel (currently less than 0.2 degrees apart) then the group is labelled as a "parallel group". This is a special case of orientation, and is dealt with in a special way. This is described below.

It is possible that up to four vanishing points could have been calculated (possibly more, as non-45 degree diagonals could have also produced a vanishing point). As mentioned above, these vanishing points, as they come from coplanar lines, should all lie along a line: the vanishing line. However, it is possible that "rogue" corners, or other inaccuracies, have led to a vanishing point that is incorrect. If this is the case, this incorrect point should lie off the vanishing line. The problem is therefore deducing which are the incorrect vanishing points, and which are correct.

To identify correct and incorrect vanishing points, all possible vanishing lines are analysed by constructing lines from each vanishing point to every other vanishing point. The distances of every other vanishing point from this potential vanishing line are calculated. The vanishing line with the fewest rogue points (those greater than a threshold distance away from the line) is found. If this line has any rogue vanishing points, then they are eliminated, as they are likely to be inaccurate. This process is repeated until either all the remaining vanishing points are within a threshold distance from the line, or, after the elimination only two vanishing points remain.

A line of best fit is then constructed through the remaining vanishing points. This is then defined as the vanishing line 611 as illustrated for example in FIG. 4.

Figure 13:
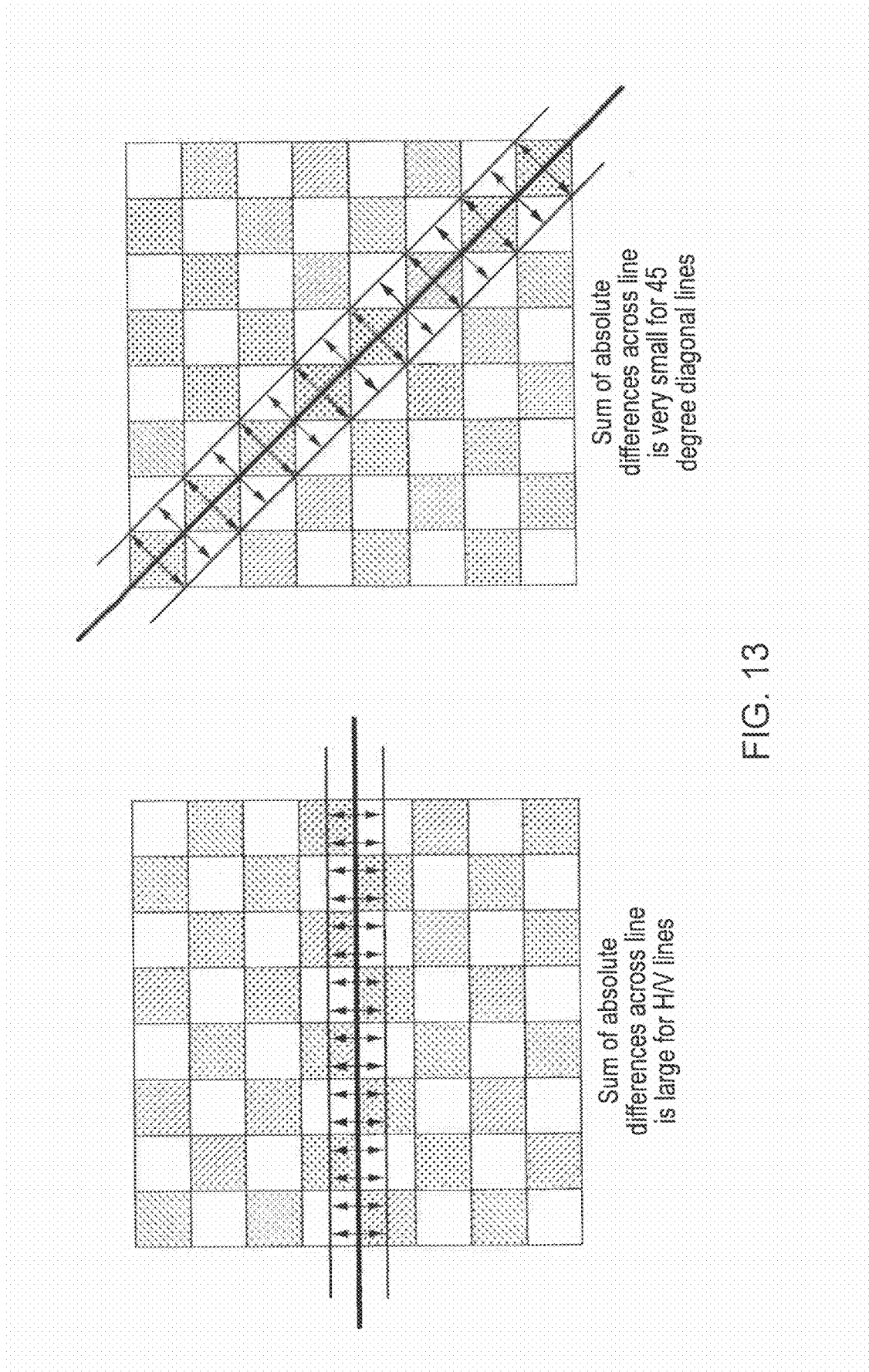
FIG. 13 illustrates part of a process for determining if a line is vertical or horizontal line, or if a line is a 45 degree diagonal line.

To determine whether a line is a horizontal/vertical (i.e. running along the edges of the squares of the checkerboard), a 45-degree diagonal line, or a diagonal of another angle, the original captured image needs to be analysed, particularly the difference in levels across the line, as illustrated in FIG. 13. As shown in FIG. 13, for groups of lines where the lines have a very large sum of absolute differences across the lines with the group, these lines are declared as horizontal/vertical lines. Those with a very small sum of absolute difference are declared as 45-degree diagonals. Those with intermediate values are declared as other diagonals, and are not used any further, as their exact orientation is not known.

$$OrientationScore = \frac{\sum_{j=0}^{B}\sum_{i=0}^{N} abs(leftLuminance_i - rightLuminance_i)}{BN} \quad \text{Eq 6-1}$$

Where:

$B$ = number of lines in group $N$ = number of samples to take along line (currently 50)

Then:
If (OrientationScore<0.5*(maxAveLum−minAveLum))
  Group is 45-degree diagonal;
Else if (OrientationScore<0.8*(maxAveLum−minAveLum))
  Group is non-45-degree diagonal;
Else
  Group is horizontal/vertical;
Where minAveLum and maxAveLum are the minimum and maximum luminance values once averaged along a line respectively.

As explained above, at least two orthogonal vanishing points are typically used to calculate the orientation of the camera. If vanishing points derived from horizontal/vertical lines are not available, then the two 45-degree diagonal vanishing points are used. If neither are available, then the camera orientation cannot be calculated and the process can be aborted.

If both pairs of orthogonal vanishing points are found, then the two orthogonal vanishing points whose groups contain the most lines can be used. For example pairs of orthogonal vanishing points maybe the horizontal/vertical or 45-degree vanishing points.

The camera angles are then calculated according to the equations set out above.

The order in which the two vanishing points are selected does not matter, in other words which is considered the x-axis, and which the z axis relative to the calibration surface. This "quadrant ambiguity" can be fixed at a later stage which is described below.

To determine an accurate alpha (perspective), as mentioned above, requires the vanishing points to be accurate in distance as well as direction. In theory, the alpha value can be calculated from any of the vanishing points' x or y coordinates on the captured image once the camera orientation angles have been found.

To increase the chances of getting an accurate alpha value, the x coordinate of the vanishing point with the highest confidence value as calculated above is used.

Therefore, if the x-axis vanishing point has the higher confidence score:

$$\alpha = \frac{-x_{vpx}\cos\theta x \tan\theta_y}{(\cos\theta z + \sin\theta x \tan\theta y \sin\theta z)} \quad \text{Eq 6-2}$$

Or if the z-axis vanishing point has the higher confidence score:

$$\alpha = \frac{-x_{vpz}\cos\theta x}{(-\tan\theta y \cos\theta z + \sin\theta x \sin\theta z)} \quad \text{Eq 6-3}$$

As described above, the origin is initially estimated from the corner point nearest to the centre of the corner distribution. The centre is defined as the average of the minimum and maximum x and y coordinates on the checkerboard pattern of all the corners. The origin can be refined later: first by the distribution of the calculated world coordinates of the detected corners, and then by the coloured marker detection.

As described above, the camera scale can be estimated from the distance between corners on a line through the origin corner, and the origin corner itself. To find the corners on a line through the origin corner, first the lines which pass through the origin corner need to be found. Then for each line that passes through the origin corner, all the other corners on that line are found.

At this stage, it is not necessarily known whether these lines follow the x-axis, the z-axis, are 45-degree diagonals (and if so, in which direction), or diagonals of other angles. To determine this, two estimates of S are calculated (one each from the x and y captured image coordinates) for each of the HN/45-degree diagonals: if the two S estimates are approximately the same, then the current tested orientation is the most likely. In other words:
For each line through the origin corner:
estimateCameraScaleFromXLine (Equation 5-5)
If two estimates from each corner closely match then use these, else:
estimateCameraScaleFromZLine (Equation 5-6)
If two estimates from each corner closely match then use these, else:
estimate CameraScaleFromDiag1Line
If two estimates from each corner closely match then use these, else:
estimate CameraScaleFromDiag2Line
If two estimates from each corner closely match then use these estimated lines.

For all line orientations, all corners along that line are analysed. The world coordinate distances between the corners must be an integer number. Therefore, all corners on a line should produce estimates of S/X (where X is the unknown three dimensional world coordinate relative to the calibration surface) which are integer divisions of S. These integer divisions can be factorised out, and an estimate for just S found. After all the lines through the origin corner have been analysed, an average estimate of S can be calculated.

It is possible that analysing the lines through the estimated origin corner do not produce enough estimates of camera scale: either because too few lines pass through the origin corner, or too few corners are present on those lines. In these cases, other lines passing through other corners need to be analysed. As mentioned above, the camera scale estimate is essentially the distance from the camera to the world coordinate origin on the calibration surface. This distance is likely to be significantly greater than the width of the checkerboard squares. Hence, using a different detected corner as the "origin corner" should not produce a camera scale estimate that is significantly different.

Therefore, the same process can be used on other corners to generate further estimates of S until there are 12 or more estimates. This should produce an estimate that is more robust to occasional erroneous estimates. The estimate of S will be refined at later stages.

There are some potential special cases of orientations of the camera that may result in unstable, inaccurate, or no results at all when calculated using the normal processes described above. This is primarily because there exist orientations where lines which are parallel in world space are also parallel on the captured image and do not produce vanishing points. Inaccuracies in the measurement of corner locations mean a vanishing point may be calculated, but this maybe unlikely to be accurate. Therefore, before calculating the vanishing point locations, a processing stage can be added that checks each group of world-parallel lines. If the angles between adjacent lines are less than, for example, 0.2 degrees on average, then the groups are labelled as "Parallel".

In some examples of the present technique where the image processor is a cell processor, a second SPU program is used to calculate the camera parameters for these special cases. The set of parameters with the lower average corner pixel error is then selected as the final output as discussed below. This allows for error minimisation for both sets of parameters.

In a first special case, all lines are parallel on the captured image. This occurs when the camera is pointing directly at the board. The result is that all the lines on the board that are parallel in real-world space will be parallel on the captured image as well. This is shown in FIG. 14a. As suggested, this case occurs when the camera is pointing directly parallel to the y-axis relative to the calibration surface. This, in itself, gives us some of the parameters:
Pitch angle=90 degrees
Roll angle=0
Yaw angle=angles of line groups For this orientation, the alpha and Camera Scale(S) parameters are linked and cannot be determined separately. Hence, an arbitrary value of alpha of 1 can be set, and the size of the checkerboard squares on the screen be used to determine S.

In a second special case one set of board lines are parallel on the captured image. An example of this special case is where the camera is aligned so that it points down a line parallel to the x or z axis. This is shown in FIG. 14b. In this case, most of the procedures used in calculating the camera parameters for normal cases can be used. The direction of the parallel line group can be used in the same way as the direction of a vanishing point. However, for calculating alpha the distance (radius) of the other, orthogonal, vanishing point is the only one that can be used. Also, the ratio of distances between adjacent lines in the two orthogonal directions needs to be measured: this can be achieved by ordering the lines in each group according to their radius and finding the differences in radii ($dr_x$, $dr_y$).

If using HN vanishing points:

$$\text{Roll} = \theta_z = -a\tan\left(\frac{y_{vpx}}{x_{vpx}}\right) \quad \text{Eq 6-4}$$

$$\text{Pitch} = \theta_x \approx -a\sin\left(\frac{dr_x}{dr_z}\right) \quad \text{Eq 6-5}$$

$$\text{Yaw} = \theta_y \approx a\tan\left(\frac{\sin(\text{Pitch})\left(\frac{-y_{vpz}y_{vpx}}{x_{vpz}x_{vpx}} - 1\right)}{\frac{y_{vpz}}{x_{vpz}} - \frac{y_{vpx}}{x_{vpx}}}\right) \quad \text{Eq 6-6}$$

$$\text{Alpha} = \frac{-x_{vpz}\cos\theta x}{\sin\theta x \sin\theta z - \tan\theta y \cos\theta z} \quad \text{Eq 6-7}$$

Camera Scale (S) can be found in the usual way.

The processes described above can provide an estimate for each of the necessary camera parameters. However, in some circumstances these estimates may not be very reliable, and if used without further refinement might result in a rather wobbly and poorly-matched computer generated object insertion. Therefore, various extra processing stages can be undertaken to improve the accuracy of the camera parameter estimates, thus reducing wobble and other ambiguities (such as in origin location and the yaw angle of the checkerboard). To be able to check camera orientation and positions parameter estimates against all the corners of the checkerboard that have been detected, it needs to be determined from which world coordinate each corner originated. Then the real-world coordinates can be transformed back into captured image coordinates and compared with the detected corner locations.

Some facts are known about the world coordinates already of the corners already:
1. All corners are on the calibration surface, so y=0
2. The x and y real-world coordinates of all corners are integers.
3. For a 8×8 checkerboard, it is known that the x and z coordinates lie between −3 and +3.

Equations 2-12 and 2-13 can be rearranged to find x and z (world coordinates) from the captured image coordinates and the camera parameters:

$$x = \frac{\begin{array}{l}-S((O_xY_s - O_yX_s)c_xc_y + \\ \alpha s_y((O_x - X_s)s_z + (O_y - Y_s)c_z) + \\ \alpha s_xc_y((O_x - X_s)c_z - (O_y - Y_s)s_z)\end{array}}{\alpha(c_x(X_ss_z + Y_xc_z) + \alpha s_x)} \quad \text{Eq 7-1}$$

$$z = \frac{x(X_sc_xs_y - \alpha c_yc_z + \alpha s_xs_yc_z) + S(O_x - X_s)}{-X_sc_xc_y + \alpha s_yc_z - \alpha s_xc_ys_z} \quad \text{Eq 7-2}$$

Where:
$s_x = \sin\theta_x$, $c_x = \cos\theta_x$,
$s_y = \sin\theta_y$, $c_y = \cos\theta_y$,
$s_z = \sin\theta_z$, $c_z = \cos\theta_z$ The results of Equations 7-1 and 7-2 are rounded to the nearest integer. As an additional confirmation step, a count is made of how many results are rounded down to the nearest integer, and how many rounded up, and by what factor. In particular, the rounding of corners with world coordinates where x or z are 1 are analysed.

If the roundings are a mixture of round ups and round downs, then the camera parameter estimates are probably reasonable, and no change is required at this stage. If, however, all of the coordinates with x or z of 1 are rounded in the same direction, then the scales may be inaccurate enough that the outer corners actually round to the wrong integer. In these cases, the world coordinate calculations are undertaken again, but multiply the calculated results by a scale factor to increase the chance that all corners will round to the correct integers.

The distribution of the source (i.e. real-world) coordinates of the corners is now analysed. If the initial estimate of the origin corner location was correct, then the corner world coordinates should be distributed between −3 and +3 in both x and z directions. If, for instance, several coordinates appear to have an x coordinate of −4, whilst none appear at +3, then it is likely that our origin estimate is offset from where it should be. Therefore 1 can be added to each x coordinate, resetting the origin estimate to the corner that now has a world coordinate of (0, 0, 0).

After the origin estimate is realigned, there may still be some corners whose world coordinates appear to be outside the range −3 to +3 in x or z. It is likely that these are therefore rogue corners that have not been eliminated at the corner confirmation stages. These should be eliminated now, to prevent their distorting the results of the error minimisations stages which follow.

The world coordinates of currently detected corners can also be recalculated using the camera parameters determined from a previously captured image. This allows confirmation checks to be made, and backup world coordinates if the original camera parameter estimates for the current captured image are wildly inaccurate.

To confirm and refine the camera parameters calculated so far, it may be necessary to compare them with the mappings for each corner. By searching over a range for each parameter, a combination of parameters can be found that produce the minimum total error in captured image pixel locations (as summed over all the corners). From Equation 2-1:

$[ScreenLocation] = [ProjectMatrix][ViewMatrix][WorldLocation]$ Eq 7-3

Therefore:

$[CornerErrorVector] = [CalcScreenLoc] - [MeasuredScreenLoc]$ $$TotalError = \sum_{c=0}^{N}(length(CornerErrorVector_c))^2 \quad \text{Eq 7-4}$$

Where:
$N$ = number of corners

The average pixel error per corner can then be expressed as:

$$AverageCornerPixelError = \quad \text{Eq 7-5}$$
$$\frac{screenWidth}{2} \times \sqrt{\frac{TotalError}{NumberOfCorners}}$$

The parameters that are varied to find the minimum total error are as follows:
Pitch angle, yaw angle, roll angle, alpha, camera scale.

The origin position should not need to be varied as it is derived directly from a corner location.

These five parameters need to be searched over a wide area as the initial estimates may not be that accurate; they also need to be refined to an accurate degree, and therefore searched with a small step size. To achieve both these conditions, with limited processing time, a multi-stage process is used:

1. Search over a wide range of all five parameters with a coarse step (i.e. few steps). Searching over five variables is potentially the slowest in terms of processing time, so the number of steps used is necessarily low.
2. Refine the camera angles (only) using a fine step size. This stage is performed twice: once with the original corner source coordinates, and with those derived using the previous frame's parameters. The resulting angles from the coordinate set with the lowest minimum total error are used.
3. Search within a narrow range of angles around the previous frame's angles (using the previous frame's alpha and camera scale). If this stage produces a lower total error than stage 2 then use the angles from this stage instead.
4. Refine the alpha and camera scale using a fine step size.

Even after the above processes have been undertaken, ambiguities may still exist in both the origin location (especially if part of the board is obscured, or undetected due to lighting conditions) and the yaw quadrant (i.e. 90 degree) orientation. Also, if for example, a tiled floor is being used for tracking, rather than a checkerboard of fixed size, then some translation reference is needed to specify which tiles are at which world coordinates, as the detection will alias at the tile frequency. Therefore, as mentioned above, in some examples, the image processor is operable to detect from the calibration pattern a plurality of further corner features, each corner feature being uniquely identifiable by the image processor.

In some examples of the present technique, to remove these ambiguities, four different coloured markers are placed in the middle of the four outer squares of the checkerboard. For an 8×8 checkerboard these correspond to world coordinates of (±3.5, 0, ±3.5). The four markers will be of colours that can be preset, for example red, blue, green and yellow. This is illustrated in FIG. 15 in which the four markers are shown on the checkerboard as "Red", "Blue", "Green" and "Yellow".

To detect the coloured markers shown in FIG. 15, firstly the known real-world coordinates are multiplied by the MVP matrix, described in Equation 2-9, to give the expected location within the captured image. The nearest pixels to these captured image locations are then identified.

The identified pixels may not exactly match the preset colours, as the lighting conditions may vary. However, the identified pixel colours, when considered as vectors, should be in roughly the same direction from a "central" colour vector. Therefore, the first step here is to subtract a "central" colour from the presets as well as the identified colours. The central colour is based on an average luminance of the checkerboard, as found in earlier stages of processing. A vector dot product between the two colours (preset minus offset and identified pixel colour minus offset) is calculated. The dot product is divided by the magnitudes to give the angle between the vectors. Those with the closest matching angles are flagged as matches.

The MVP Matrix used can be created using the yaw angle between zero and 90 degrees, i.e. yaw90=mod(yaw, 0.5*PI) For example, for the red marker:

$$[ExpectedScreenLocation] = [MVPMatrix][3.5\ 0\ 3.5\ 1] \quad \text{Eq 7-6}$$

$[ReadBackColour] =$

PrYPb Values at Expected Screen Location $$\cos(\text{angle}) = \frac{[ReadBackColour - \text{Offset}] \cdot [PresetRedColour - \text{Offset}]}{|ReadBackColour - \text{Offset}||PresetRedColour - \text{Offset}|}$$

If(cos(angle) > threshold)then Match = true

Else Match = false

The first purpose of the markers is to confirm the origin location. To that end, the four possible marker matches are tested for origin locations at integer x and z translations away from the current estimated real-world origin location (including the current position). In other words:

$$[PossibleRedStickerWorldLoc]=[3.5\ 0\ 3.5\ 1]^T + [p\ 0\ q\ 0]^T \quad \text{Eq 7-7}$$

Where: p, q are integers between −3 and +3.

The origin offset which produces the highest number of marker detections becomes the new origin.

Once the correct origin has been found, the colours of the four markers can be used to determine the correct yaw quadrant (i.e. the 90-degree quadrant in which the correct yaw angle lies).

As the yaw angle used to find the marker locations was reduced to an angle between zero and 90 degrees, it is a simple matter to add multiples of 90 degrees back onto the yaw angle. This works well as the yaw angle rotation is the first to be applied to the world coordinates (see Equation 2-2).

The world coordinates used to find the stickers can be done in the following order:
(−3.5, 0, −3.5); (3.5, 0, −3.5); (3.5, 0, 3.5); (−3.5, 0, 3.5)

By analysing the four colours detected in these locations, a yaw quadrant offset can be found, as in the table 1 below:

TABLE 1

Colour Marker Locations and their Effect on Yaw Quadrant

| (−3.5, 0, −3.5) | (3.5, 0, −3.5) | (3.5, 0, 3.5) | (−3.5, 0, 3.5) | yawQuadrantOffset (degrees) |
|---|---|---|---|---|
| Green | Yellow | Red | Blue | 0 |
| Blue | Green | Yellow | Red | 90 |
| Red | Blue | Green | Yellow | 180 |
| Yellow | Red | Blue | Green | 270 |

The final yaw angle=yaw90+yawQuadrantOffset

If fewer than 2 markers are detected, then the yawQuadrantOffset from the previous captured image is used.

As mentioned above in regard to the special cases, there are potentially two sets of camera parameters returned from two separate calculations. The set with the lowest average corner pixel error is selected, provided that this error is less than 2 pixels on average. If both errors are greater than 2 pixels, then it is believed that the camera parameters are not correctly locked and the previous frame's parameters are used. Therefore, if the checkerboard is not being tracked properly, then the camera parameters can be "frozen" until the checkerboard is found accurately again.

The determined camera parameters may also be filtered using a simple infinite impulse response (IIR) filter, by mixing the current values with values derived from a previous captured image (currently an equal, 50/50 mix). For the camera angles, the mixing may be complicated slightly by the fact that angles can wrap around 360 degrees. To account for this, the angle difference (between current and previous frames' angles) is found (allowing for wrap-around), and a fraction of this (currently 50%) is added to the previous frame's angle.

As will be understood, not all the above described steps are necessary for the estimation of the orientation and position of the camera when the calibration pattern is a checkerboard pattern. Many of the steps, for example those improving the accuracy of the estimation of the camera parameters are optional, or may be conditional depending on certain factors such as the quality of the images provided by the camera, the distance of the camera from the calibration surface, the quality of the lighting conditions and so on.

Figure 16:
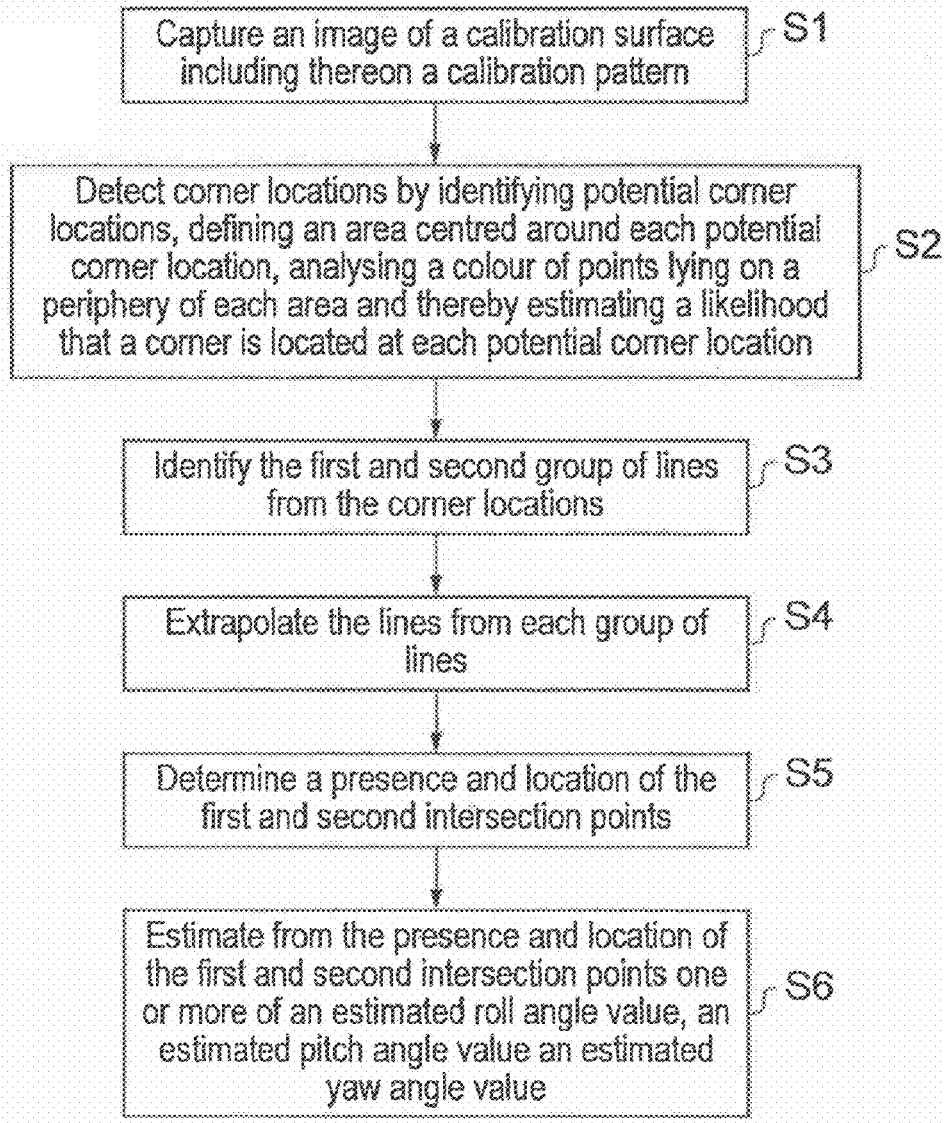
FIG. 16 shows a flowchart illustrating the steps comprising a method of estimating camera parameters from a captured image.

FIG. 16 shows a flowchart illustrating the steps comprising a method of estimating camera parameters from a captured image. At step S1, the image of the calibration surface is captured; at step S2 corner locations on the calibration surface are detected by identifying from the video signal a plurality of potential corner locations, defining an area of the scene as viewed by the camera centred around each potential corner location, analysing a colour of points lying on a periphery of each area and thereby estimating a likelihood that a corner is located at each potential corner location. At step S3 a first and second group of lines are identified from the corner locations; at step S4 the lines are extrapolated; at step S5 a presence and location of first and second intersection points is determined, and at step S6 one or more estimated roll angle value, pitch angle value and yaw angle value are generated.

Although the examples described above, have largely been explained in terms of individual captured images, the captured images referred to could be part of a video stream (for example video frames) generated by the camera and transmitted to the image processor in any appropriate video format. Furthermore, the captured images/video transmitted by the camera may be appropriately compressed at suitable points during processing, in accordance with appropriate compression standards for example Mpeg 4.

Furthermore, when implementing the examples of the technique described above, various modifications may be made. For example, if a computer generated object is to be inserted into a composite image, the calibration surface could be imaged temporarily, allowing the image processor to determine the position and orientation of the camera in a first position. Subsequently the calibration surface could be removed and any change in orientation and position of the camera could be determined according to other means such as telemetry feedback from servo motors connected to the camera.

Furthermore a video signal generated by the camera may comprise a plurality of video frames and the image processor may be operable to estimate one or more of the estimated roll angle value, the estimated pitch angle value and the estimated yaw angle value for individual video frames of the video signal.

Estimating Light Direction

A technique of estimating light direction will now be explained with reference to FIGS. 17a to 20.

FIG. 17a provides a schematic diagram illustrating a technique of estimating light direction. A camera 1 is provided as described in the above examples. A reference object 171, illustrated in FIG. 17a is a sphere, but as explained further below, any suitable three dimensional object, for example a cube, a hemisphere or any other partially spherical object could be used. In the illustration shown in FIG. 17a, the reference object 171 is being illuminated by a light source (not shown).

The image processor 2 is operable to receive an image of the scene captured by the camera 1 including the reference object 171 and identify parts of the image which correspond to the reference object. In some embodiments the image processor 2 is arranged so that it can distinguish the reference object 171 from other objects that may be present in the captured image. This may be aided by the colouring of the surface of the reference object and/or by its shape and surface texture. The reference object may be of a predetermined shape to assist detection by the image processor. In such embodiments, the image processor 2 does not need to analyse the captured image to identify the reference object 171 within the captured image because a location of the reference object 171 within the scene (and thus the position within the captured image) is predefined, for example by pre-programming the position into the image processor.

In some examples the reference object 171 is provided with a matt surface.

Once the image processor 2 has identified the parts of the image corresponding to the reference object, it is operable to estimate a direction of light incident on the reference object based on a luminance distribution across the surface of the reference object. This is explained further below.

As will be understood, the luminance over the surface of the reference object 171 will vary in dependence on the direction from which it is being illuminated by the light source. Moreover, for a simple reference object which scatters a proportion of incident light, a point at which the luminance might be expected to be at a maximal value would be a point on the reference object where the surface is perpendicular to the direction of the light. Thus, the detection of such a point can be used to estimate the direction of the incident light. For example, with reference to FIG. 17a, a point 172 at which the luminance is greatest on the reference object 171, would typically be expected to be at a point on the surface of the reference object which is perpendicular to the direction of incident light. This can thus be used to determine the direction of the incident light.

As discussed above, the image processor 2 may be operable to produce a composite image based on the image captured by the camera 1 including a rendering of a computer generated object. FIG. 17b shows the apparatus of FIG. 17a in which the estimation of the direction of the light generated by the image processor is used to render a computer generated object 181 in a composite image 182. FIG. 17b shows a first arrow 183 which corresponds to the estimated direction of light based on the luminance of the reference object 171. Making the assumption that the light directed on the reference object 171 is parallel (i.e. focused at infinity), a second arrow 184 illustrates the direction of light that can be used for rendering the computer generated object 181. The particular way that the rendered computer generated object 181 will appear in the composite image 182, will depend on its shape and light reflecting properties attributed to it by the image processor 2. However, the overall effect should be an improvement in how realistic it looks as it will be illuminated in a similar way to other objects within the captured image.

As can be seen from the composite image 182, the computer generated object 181 has been rendered such that it appears that it is illuminated by light coming from the same direction as the estimated direction of the light. As explained above, in order for the image processor to estimate a direction of light incident on the reference object, the luminance distribution across the surface of the reference object must be determined along with information regarding the shape of the reference object.

Figure 18B:
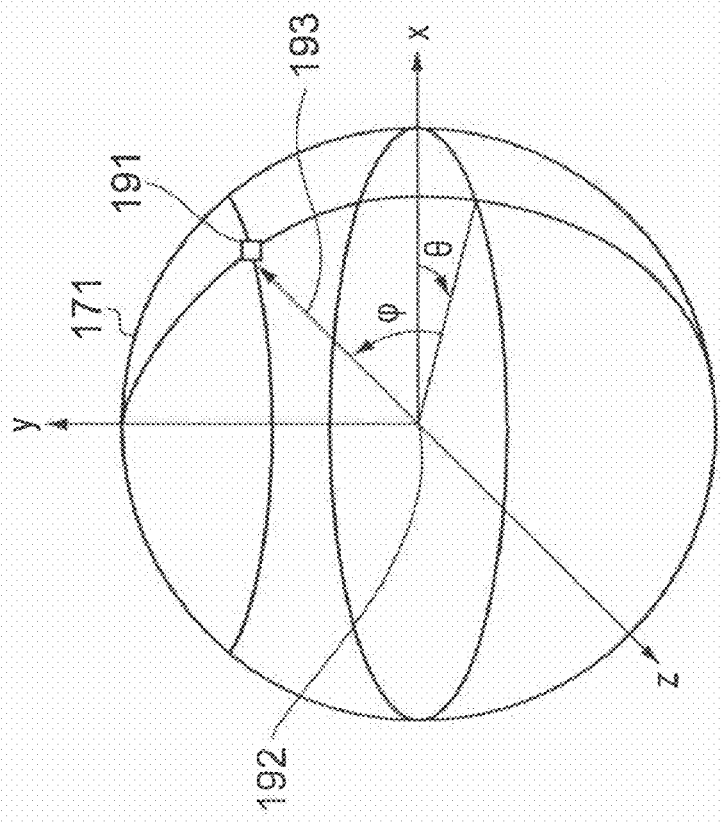
FIG. 18b provides a schematic diagram illustrate sampling luminance magnitudes across a surface of the reference object.
Figure 18A:
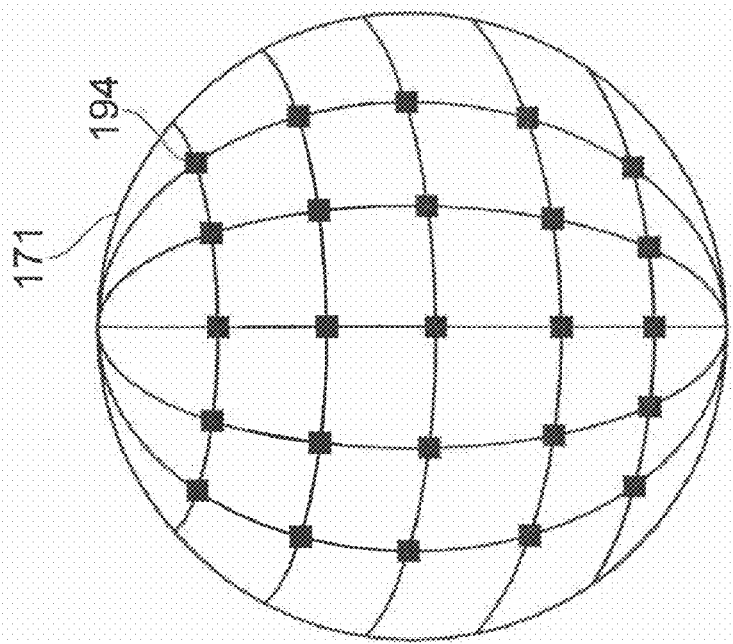
FIG. 18a provides a schematic diagram showing the components of a vector in a spherical reference object.

FIG. 18a shows a more detailed diagram of a spherical reference object 171. If a first point 191 on the surface of the spherical reference object 171 is the point at which the luminance is the greatest, then a vector originating at a centre point 192 of the spherical reference object 171 and passing through the first point 191 provides a point at which the surface of the object is perpendicular to the direction of the light and thus indicates the direction of light incident on the spherical reference object 171. As shown in FIG. 18a, the direction of the vector 193 can be expressed in terms of polar coordinates $\theta$, $\phi$. Although the reference object used here is a sphere it will be understood that any appropriate shape can be used for a reference object providing the image processor can determine the three dimensional nature of its surface from the captured image.

In some examples, x, y and z axis (relative to which the polar coordinates are defined) can be provided in accordance with the schemes described above for estimating the position and orientation of the camera 1.

When estimating the direction of light from the captured image of the reference object, it is possible to simply identify the point on the surface at which the luminance is the greatest. However, in certain situations, for example if there are multiple light sources or if the overall luminance of the portion of the reference object visible to the camera is saturated or approaching saturation, then identifying a single point may be impossible or may lead to a less accurate and more "noisy" estimate. Therefore, in some examples, the image processor samples the reference object at points over its entire surface and the luminance at each sampled point is determined. This is shown in FIG. 18b. FIG. 18b shows the spherical reference surface 171 including a plurality of sampling points 194. A luminance vector is calculated for each of the sampling points 194, the magnitude of the vector being determined by the luminance at a particular sample point, and the direction of the vector (in other words values for $\theta$ and $\phi$) being determined as shown in FIG. 18a. In other examples where the reference object is a different shape, the direction vectors will be determined based on a direction perpendicular to the surface at the sampled point.

When all the luminance vectors have been generated, an average of all the luminance vectors is calculated. It is the direction of this averaged vector which forms the estimate for the direction of the incident light.

In some situations, for example due to the luminance across the visible area of the reference object being saturated or nearly saturated, the light source being distant and/or relatively dim, it may be difficult to extract accurate luminance data from the reference object. Therefore, a clipping level may be set. Any luminance samples which are determined to be below the clipping level are ignored. The clipping level may be an absolute predetermined value, or maybe set relative to prevailing luminance conditions in the captured image. FIG. 19a and FIG. 19b illustrate the concept of clipping.

FIG. 19a shows an example of a spherical reference object identified from the captured image. As can be seen, a greater part of the luminance of the visible surface of the reference object is saturated. FIG. 19b shows an example of the reference object 201 after it has undergone clipping. A hatched area 202, indicates the parts of the surface of the reference object which have a luminance below the clipping level. Only samples within a remaining area 203 are used to estimate the direction of the light.

In some embodiments, the image processor is operable to take into account the orientation and position of the camera 1 (determined for example with reference to the calibration surface as described above), when the direction of the incident light is estimated. Accordingly, the direction of light relative to the calibration surface, i.e. a "real-world" estimate of the direction of the incident light can be determined. Therefore, movement of the camera 1 (which will result in a change of direction of the incident light, relative to the camera 1) may also be taken into account when rendering composite images.

Furthermore, movement of the camera will mean that the position of the reference object, as viewed by the camera, i.e. in the captured image, will change. In embodiments in which the location of the reference object is pre-programmed within the image processor, the image processor may recalculate the position of the reference object in the captured image, to accommodate for movement of the camera.

Figure 20:
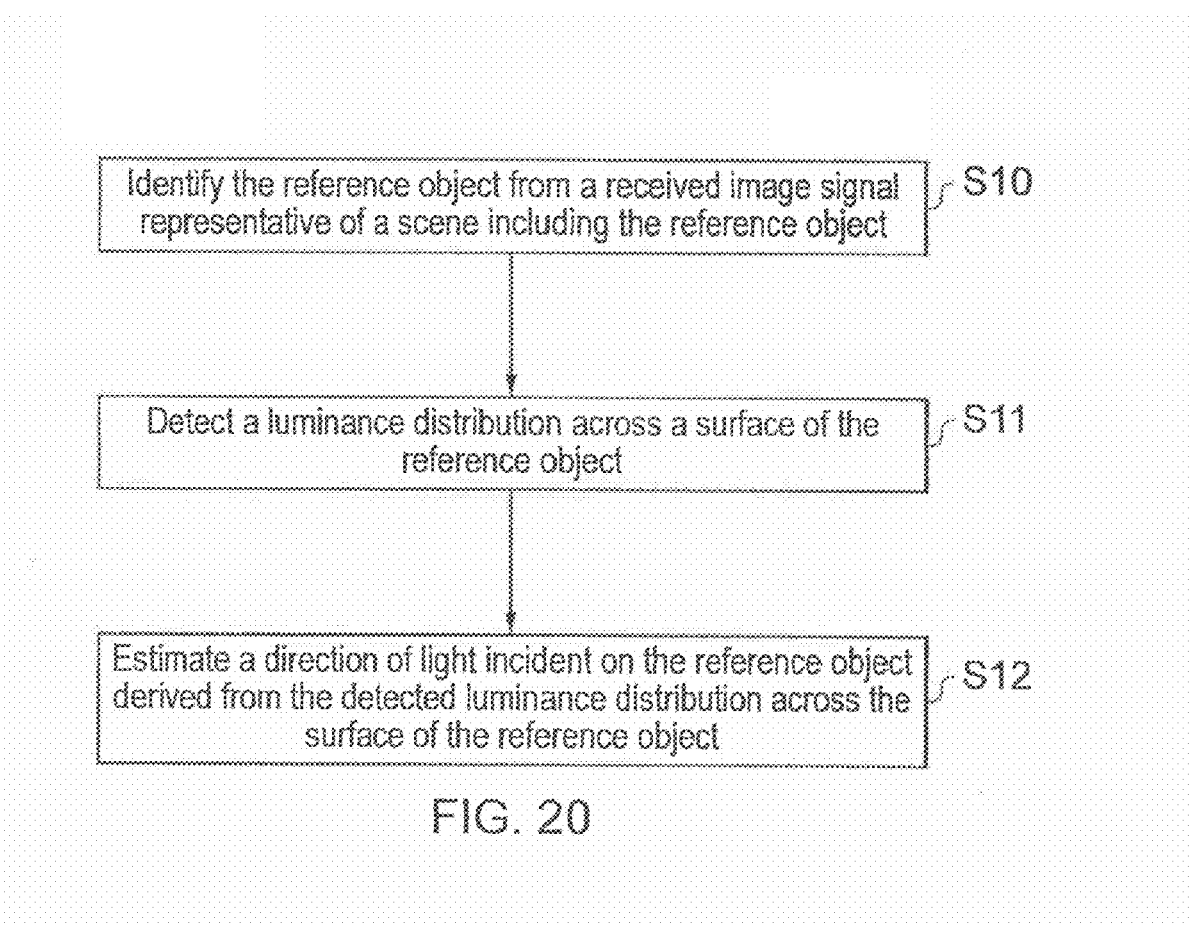
FIG. 20 provides a flow chart of a method estimating a direction of a light source.

FIG. 20 shows a flowchart illustrating the steps comprising a method of estimating a direction of light incident on a reference object of predetermined shape. At step S10 the reference object from a received image signal representative of an image including the reference object, the reference object being of a predetermined shape is identified. At S11 a luminance distribution across a surface of the reference object is detected. At step S12 a direction of light incident on the reference object derived from the detected luminance distribution across the surface of the reference object is estimated.

Shadow Interactions Between Real and Computer Generated Objects

Examples of a technique in which computer generated shadows can be rendered so that they appear to be cast on real objects will now be described with reference to FIGS. 21 to 27.

Figure 21:
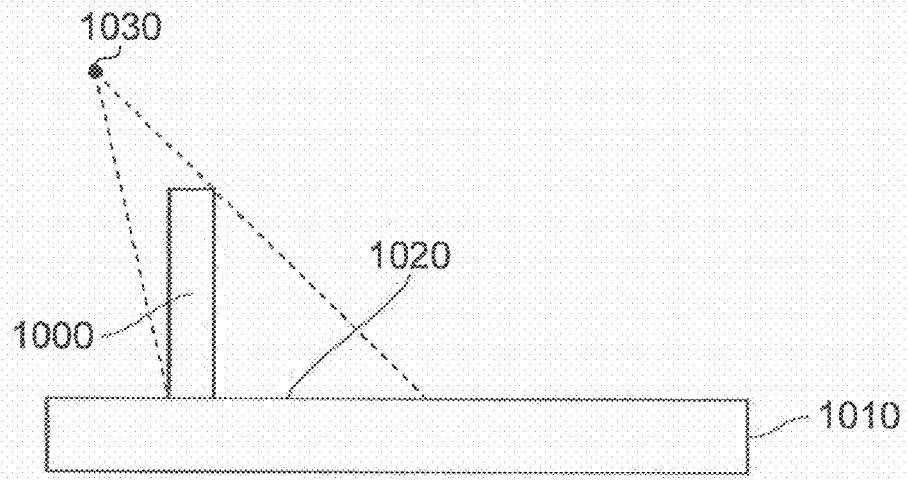
FIG. 21 is a schematic diagram of a virtual object together with a virtual model of a real object arranged such that the virtual object can appear to cast a shadow on the real object in accordance with a technique of rendering computer generated shadows.

FIG. 21 is a schematic diagram of a virtual object 1000 together with a virtual model 1010 of a real object arranged such that the virtual object can appear to cast a shadow on the real object in accordance with examples of the present technique. As can be seen from FIG. 21, a region 1020 of the virtual model (referred to as an occluded region) is hidden from a virtual light source 1030 by the virtual object 1000 as indicated by the dashed lines. In the example illustrated in FIG. 21, the virtual object 1000 corresponds to the virtual object 41' as described above with reference to FIGS. 4 to 6. It will be appreciated that the schematic diagram shown in FIG. 21 represents a side view of a three dimensional representation of the virtual object 1000 and the virtual model 1010.

In examples of the present technique, the virtual model 1010 is mapped to a position of the real object within real images captured by the camera 1 so that the virtual model corresponds with the real object. For example, the real object could be a chessboard in which squares of the chessboard act as the calibration surface 3. In this example, the virtual model would comprise a rectangular box which is mapped by the image processor 2 to correspond to the real chessboard.

In some examples, the virtual model 1010 is positioned so as to correspond to the real object using the camera tracking and marker detection techniques as described above. In other words the virtual model is automatically mapped to the position on the first object by determining an orientation and position of the first object relative to the camera by reference to a calibration surface comprising a calibration pattern on the first object. However, it will be appreciated that any other suitable method of aligning the virtual model with the real object so that they substantially correspond with each other could be used. For example, a user could manually control the position and orientation of the virtual model 1010 by using a suitable user interface.

So as to enable computer generated shadows to be rendered so that they appear to be cast on real objects, in examples of the present technique, the virtual model 1010 is such that a colour of the virtual model 1010 is black and the virtual model 1010 is substantially transparent. Consequently, if there are no computer generated shadows present in a scene (for example there are no virtual objects which cast shadows), the virtual model will be rendered so that it is not visible in the resultant combined image. It will be appreciated that any other suitable colour could be used for the virtual model, for purposes of artistic effect, or to emulate a coloured ambient light.

However, if there are computer generated shadows present in a scene (for example, the situation illustrated in FIG. 21), then the image processor 2 is operable to modify the transparency of the virtual model at the occluded regions so as to generate modified transparency regions of the virtual model.

In order that the modified transparency regions can appear to be shadows in a resultant rendered image, in some examples, the image processor 2 can modify a degree of transparency of the occluded regions (such as the occluded region 1020) so that the transparency of the occluded regions is less than a degree of transparency of other regions of the virtual model 1010. In other words, those regions of the virtual model which are not hidden from a virtual light source (such as the light source 1030) by a virtual object (such as the virtual object 1000) do not have their transparencies modified. Therefore, when the real object is rendered in combination with the virtual object 1000 and the virtual model 1010 such that the modified transparency regions of the virtual model appear combined with the real object, the modified transparency regions will appear as if they are shadows which are cast on the real object. In other words, the virtual model 1010 can be partially transparent (not completely opaque) so that light from the real light source can be reflected from the real object so that the real objects appears as if in shadow.

In examples of the present technique, the virtual model comprises a plurality of fragments which make up the model. Fragments are commonly used in 3D graphics to represent graphics data necessary to generate a pixel for output to a frame buffer and may comprise data such as raster position data, depth buffer data, interpolated attribute data, alpha value data and the like. The degree of transparency of the virtual model at each fragment is associated with a respective alpha value for that fragment. In other words, the respective alpha values of a fragment can be thought of as a transparency value for that fragment which represents the degree of transparency for that fragment. By changing the alpha values associated with the virtual model the transparency of the virtual model can easily be controlled. Alpha values and alpha blending is known in the art and so will not be described here in detail.

In the examples described herein, the alpha values of the fragments of the virtual model are modified in accordance with shadow maps associated with the virtual objects. The generation of shadow maps is described in more detail below.

In the examples described with reference to FIGS. 21 to 27, all the fragments associated with the virtual model initially have an alpha value of 0.0 i.e. the virtual model is completely transparent. It will be understood that a fragment having an associated alpha value of 1.0 corresponds to that fragment being completely opaque.

Those regions of the virtual model 1010 which are detected as being hidden from the virtual light source 1030 by the virtual object 1000 (such as the occluded region 1020) have their alpha values of their respective fragments increased to be greater than the alpha value of fragments corresponding to other (non-occluded) regions of the virtual model 1010.

In an example of the present technique, the alpha values of those fragments which correspond to the occluded regions are increased by a preset or predetermined amount. For example, where the preset amount is 0.2, the alpha values of fragments corresponding to the occluded region 1020 will be increased from 0.0 (the alpha value of the unmodified virtual model) to 0.2. However, it will be appreciated that any other suitable predetermined amount could be used subject to a maximum alpha value of 1.0.

Where there is more than one virtual object and/or more than one virtual light source in a scene, then any regions of the virtual model which are hidden from one or more virtual light sources by one or more virtual objects have their alpha values increased accordingly. An example scene in which there are two light sources and two virtual objects is shown in FIG. 22.

Figure 22:
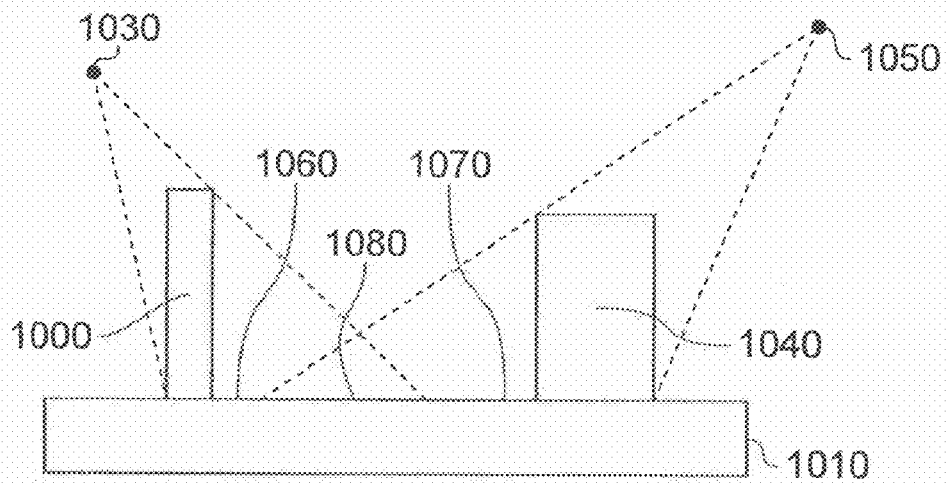
FIG. 22 is a schematic diagram of two virtual object together with a virtual model of a real object arranged with respect to two light sources so that the virtual objects can appear to cast shadows on the real object in accordance with the technique of rendering computer generated shadows.

FIG. 22 is a schematic diagram of the virtual object 1000 and a virtual object 1040 arranged on the virtual model 1010 and illuminated by the virtual light source 1030 and a virtual light source 1050. In the example shown in FIG. 22, an occluded region 1060 of the virtual model 1010 is hidden from the virtual light source 1030 by the virtual object 1000, an occluded region of the virtual model 1010 is hidden from the virtual light source 1050 by the virtual object 1040, and an occlusion overlap region 1080 of the virtual model 1010 is hidden from both the virtual light source 1030 and the virtual light source 1050 by the virtual objects 1000 and 1040 respectively.

Accordingly, the image processor 2 detects where any occlusion overlap regions occur by detecting whether at least part of a first occluded region (such as the occluded region 1060) overlaps with at least part of at least a second occluded region (such as the occluded region 1070). In examples of the present technique, those fragments of the virtual model which correspond to the first occluded region are associated with a first alpha value and those fragments which correspond to the second occluded region are associated with a second alpha value. The image processor is then operable to add the first alpha value to the second alpha value so as to generate an occlusion overlap region alpha value. The degree of transparency of the virtual model at the detected occlusion overlap regions is then modified in accordance with the occlusion overlap region alpha value. In some embodiments, the modification of the alpha value is carried out by the image processor 2 by incrementing the alpha value by a predetermined amount.

In one example, the first alpha value and the second alpha value are the same and are set to be a predetermined alpha value as described above. For example, where the predetermined alpha value is 0.2, the alpha value of the fragments in the occlusion overlap region 1080 will be modified from 0.0 to 0.2+0.2=0.4. However, it will be appreciated that any other suitable predetermined alpha value may be used.

In alternative examples, the first alpha value and the second alpha value may be different from each other. This may occur where one or more of the virtual objects has some degree of transparency.

It will be appreciated that increasing the transparency value corresponds to decreasing the degree of transparency.

It will be appreciated that the techniques described herein are not limited to simulating shadows from two virtual light source and may be applied more generally to a plurality of light source. In some examples, for every shadow that is detected as falling on particular fragment of the virtual model from a respective light source, a predetermined alpha value is added to the alpha value for that fragment. Here, a shadow is said to fall on a fragment if the fragment is hidden from a virtual light source by a virtual object. In other words, wherever a shadow falls on the virtual object corresponds to a shadow region, the shadow region being a region of the virtual model which is hidden from a virtual light source by a virtual object. In examples of the present technique, each shadow region is associated with a respective predetermined alpha value.

The image processor then detects for each fragment of the virtual model, a number of shadow regions whose position corresponds with a position of that fragment. For each shadow region whose position is detected as corresponding with that fragment, the respective predetermined alpha value which is associated with that shadow region is added to the alpha value associated with that fragment. For example, if a position of a fragment corresponds with that of four shadow regions, and the predetermined alpha value is 0.2, then the alpha value for that fragment will be 0.2+0.2+0.2+0.2=0.8. However, it will be appreciated that any other suitable predetermined alpha increment could be used.

In some examples, the predetermined alpha values associated with the respective shadow regions could be the same as each other. This simplifies calculating the alpha values as well as helping improve the realism of an image by simulating uniform shadows.

Alternatively, in other examples, the respective predetermined alpha values are different from each other, in order to achieve a desired aesthetic effect, or to simulate occlusion by transparent virtual objects.

In examples of the present technique, the alpha value of a fragment is a sum of the alpha values associated with the shadow regions whose position corresponds to that fragment subject to a maximum alpha value. If the sum of the alpha values for the fragment is greater than the maximum alpha value, then the alpha value for that fragment is limited to the maximum alpha value. In some examples, the maximum alpha value is 1.0 although it will be appreciated that any other suitable alpha value could be used as the maximum alpha subject to the maximum alpha value being less than or equal to 1.0.

In other words, detecting whether a position of a shadow region corresponds with that of a fragment and adding the respective predetermined alpha value which is associated with that shadow region to the alpha value associated with that fragment is the more general case of the examples described with respect to FIG. 22.

Figure 23:
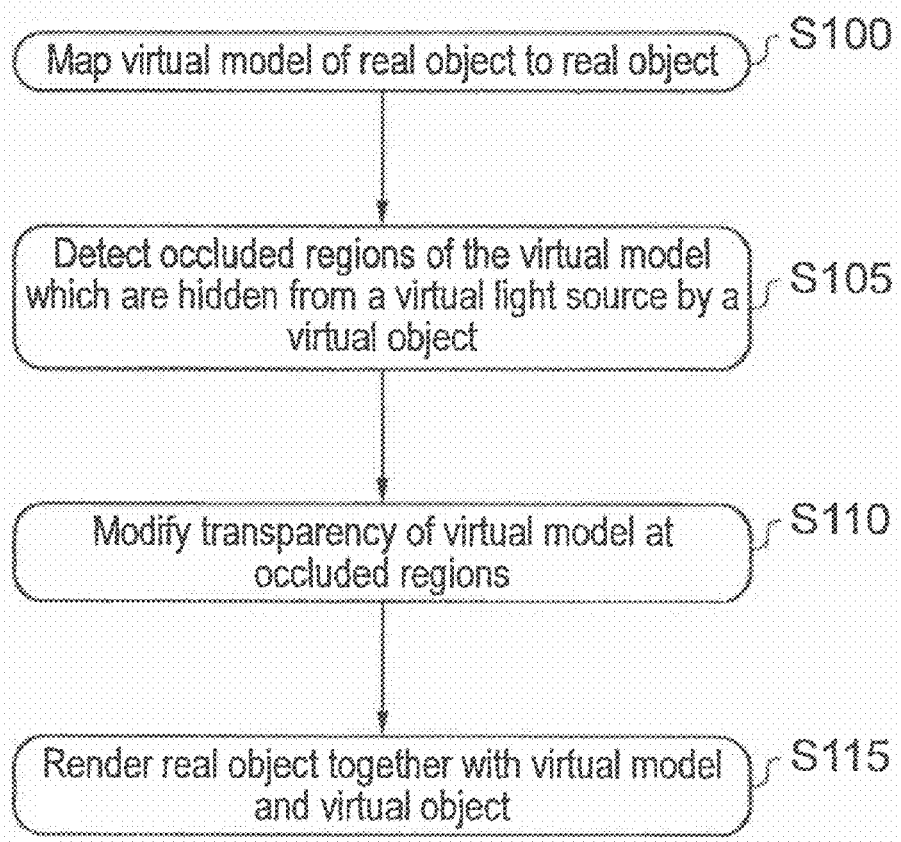
FIG. 23 is a flowchart of a method of rendering computer generated shadows in accordance with the technique of rendering computer generated shadows.

A known method of rendering computer generated shadows which can be used with examples of the present technique will now be described with reference to FIG. 23.

At a step s100, the image processor 2 maps the virtual model of the real object to the real object as described above. Then, at a step s105, the image processor 2 detects occluded regions of the virtual model which are hidden form a virtual light source (e.g. the virtual light source 1030) by a virtual object (such as the virtual object 1000). At a step s110, the image processor modifies the transparency of the virtual model at the occluded image regions so as to generate modified transparency regions as described above. Then, at a step s115, the image processor is operable to cause the real object in combination with the virtual object and the virtual model to be rendered such that the modified transparency regions of the virtual model appear combined with images of the real object.

The generation of shadow maps and the detection of occluded regions will now be described with reference to FIGS. 24 to 27.

Shadow Mapping typically requires N+1 rendering passes for a scene containing N shadow casting lights. First the scene is rendered into N off-screen buffers, once from the point of view of each shadow casting light (as if a camera was placed at the position of the light). Depth buffers of each rendering pass are then extracted and the resultant data treated as texture maps. The resultant texture maps correspond to shadow maps, and represent a distance to a closest object in the scene from the respective shadow casting light in a given direction.

Once N shadow maps have been generated, the scene can be rendered from a point of view of the camera. In some examples, projective texture mapping is used to cast the shadow maps back onto the scene from the point of view of each light (as if a projector were placed at the position of the light), so as to generate distance data which corresponds to a distance from the shadow casting light to the closest object along a ray traced between that object and the light.

The distance from a fragment to each light can also be calculated by the image processor 2 and compared with the minimum distance from each light read as indicated by the distance data for that fragment. If the distance from the fragment to the light is the same as the distance indicated in the distance data for that fragment, then the fragment is part of the closest object to that light and the fragment will be lit by that light. If the distance from the fragment to the light is greater than the distance indicated by the distance data for that fragment, then the fragment is not part of the object closest to the light, and the lighting calculation from that light is ignored when calculating the lighting of that fragment.

Additionally, in examples of the present technique, the shadow maps may be used to modify the transparency of the virtual model as described above.

Figure 24:
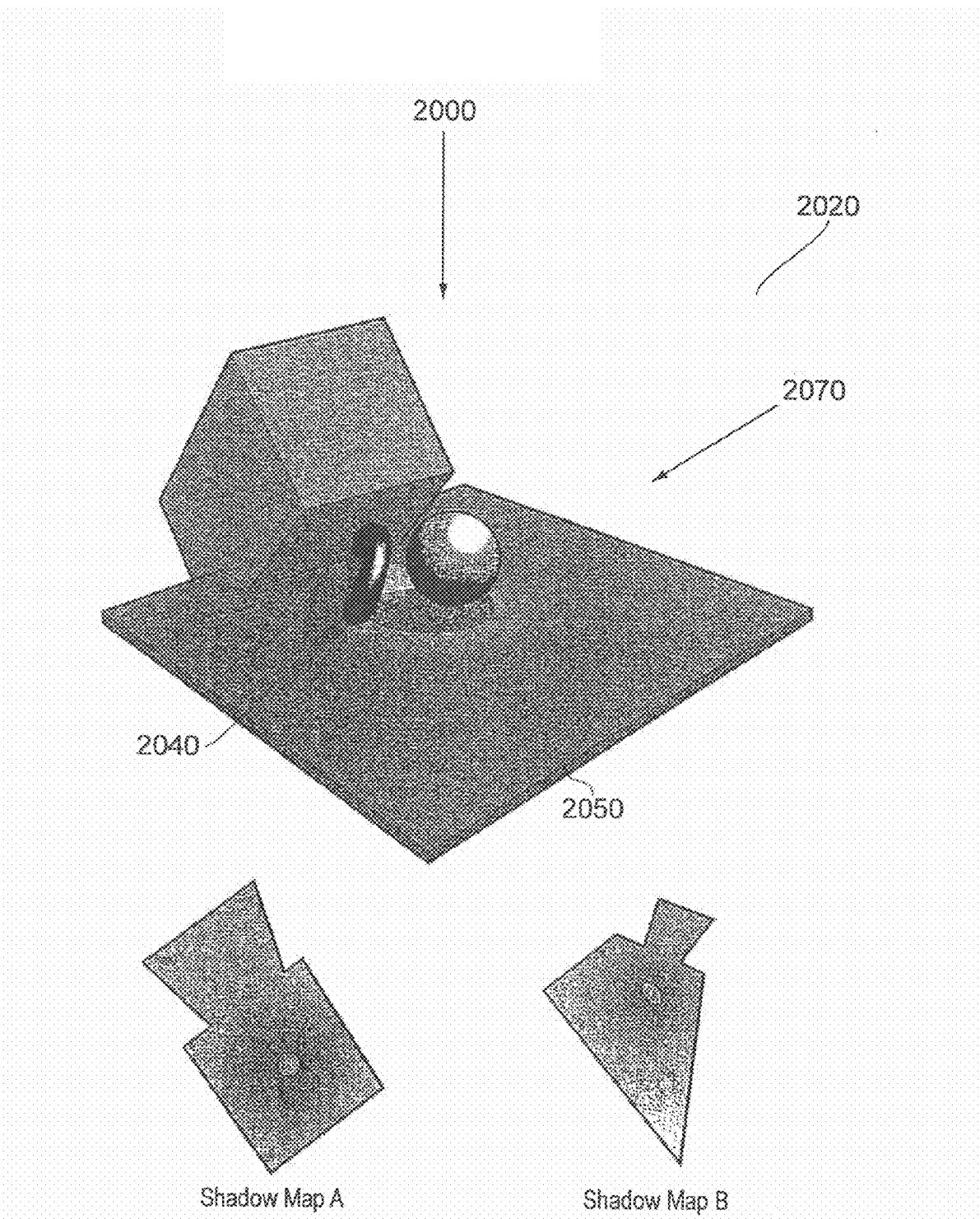
FIG. 24 is a schematic diagram illustrating an example of rendered computer generated shadows.

FIG. 24 shows an example of a rendered scene having a first virtual light sources 2000, a second virtual light source 2010, a spherical virtual object 2020, a cubic virtual object 2030, and a toroidal virtual object 2040 which intersects with a textured virtual object 2050. Although the computer generated shadows shown in FIG. 24 appear rendered on the textured virtual object 2050, it will be appreciated that the textured virtual object could be replaced with a virtual model of a real object such as a chess board (checkerboard) as described above so that the shadows appear rendered on the real object. FIG. 24 also shows a shadow map (labelled as Shadow Map A) corresponding to a shadow map for the virtual light source 2000 and a shadow map (labelled as Shadow Map B) which corresponds to a shadow map for the virtual light source 2010.

The generation of shadow maps for part of the example rendered scene in FIG. 24 will now be described with reference to FIGS. 25 to 27.

FIG. 25 shows a schematic diagram of a wire frame outline of some of the virtual objects shown in FIG. 24. In particular, FIG. 25 shows a wire frame representation 2020' of the spherical virtual object 2020, a wire frame representation 2030' of the cubic virtual object 2030, and a wire frame representation 2050' of the textured virtual object 2050.

The example rendered scene in FIG. 24 comprises two virtual light sources and therefore requires three rendering passes to render the scene and generate the required shadow maps. FIG. 26A shows the first rendering pass, FIG. 26B shows the second rendering pass, and FIGS. 27A to 27C illustrate examples of the third rendering pass.

FIG. 26A shows a schematic diagram of a first rendering pass used to generate a shadow map for the virtual light source 2000. In FIG. 26A, the scene is rendered from a point of view of a virtual camera 2000' using a projection frustum associated with the virtual camera 2000', and in which the virtual camera 2000' is placed at a position corresponding to that of the virtual light source 2000 so as to generate a shadow map 2060 for the virtual light source 2000 (corresponding to Shadow Map A in FIG. 24).

FIG. 26B shows a schematic diagram of a second rendering pass used to generate a shadow map for the virtual light source 2010. In FIG. 26B, the scene is rendered from a point of view of a virtual camera 2010' using a projection frustum associated with the virtual camera 2010', in which the virtual camera 2010' is placed at a position corresponding to that of the virtual light source 2010 so as to generate a shadow map 2070 for the virtual light source 2000 (corresponding to Shadow Map B in FIG. 24).

In FIGS. 26A and 26B, the shadow map 2070 and the shadow map 2080 are shown diagrammatically as a profile which represents a distance between the spherical virtual object 2020 and the respective virtual camera used to carry out the render pass. In the examples described herein, the shadow maps are depth textures comprising values which represent the distance between the virtual object 2020 and the respective virtual light source, scaled to lie between zNear and zFar of the respective camera's projection matrix.

For the third rendering pass, the scene is rendered from the point of view of the scene camera i.e. the camera 1 as illustrated in FIGS. 1 to 6. The image processor 2, projects the shadow map for each virtual light source onto the scene using projective texture mapping, as if from a projector placed at the position of the virtual light source. Further information on projective texture mapping can be found in "The Cg Tutorial: The Definitive Guide to Programmable Real-Time Graphics" R. Fernando and M. J. Kilgard, Addison-Wesley Professional (8 Mar. 2003), ISBN: 0-321-19496-9.

In examples of the present technique, the image processor 2 comprises a fragment shader which is implemented in hardware. However it will be understood that the fragment shader could also be implemented in software. The fragment shader carries out the projection of the shadow maps onto the scene. However, it will be appreciated that any other suitable methods for projecting the shadow maps onto the scene could be used.

FIG. 27A shows an example of points in a scene to be rendered in accordance with the generated shadow maps. In particular, FIG. 27A shows four example points $P_1$, $P_2$, $P_3$, and $P_4$. Point $P_1$ is in a shadow cast by the virtual light 2010, but is lit by the virtual light 2000. Point $P_2$ is in shadows cast by both the virtual lights 2000 and 2010, and is therefore not lit by either of the virtual lights. Points $P_3$ and $P_4$ are not in shadow, and these points are lit by both the virtual light 2000 and the virtual light 2010.

FIG. 27B illustrates how the shadowing for a fragment position at $P_1$ is calculated. The image processor 2 projects the shadow map for the virtual light 2000 (also referred to as light $L_1$) onto the scene and a distance $d_{L1\text{-}SP1}$ as shown in FIG. 27B is read from the pre-calculated shadow map which was generated from the virtual light 2000 using known techniques. The distance $d_{L1\text{-}SP1}$ represents a distance from the virtual light 2000 (light $L_1$) to a fragment of a virtual model which is detected as being closest to the virtual light 2000 (light $L_1$) along a ray path between the virtual light 2000 and the point $P_1$. In this case, a fragment of the textured virtual model 2050' at the point $P_1$ is closest to the virtual light 2000 as indicated by the double headed arrow labelled $d_{L1\text{-}SP1}$ in FIG. 27B.

Additionally, the shadow map for the virtual light 2010 (also referred to as light $L_2$) is projected onto the scene and a distance $d_{L2\text{-}SP1}$ as illustrated by the double headed arrow in FIG. 27B is calculated. The distance $d_{L2\text{-}SP1}$ represents a distance from the virtual light 2010 (light $L_2$) to a fragment of a virtual model which is detected as being closest to the virtual light 2010 (light $L_2$) along a ray path between the virtual light 2010 and the point $P_1$. In this case, a fragment of the spherical virtual model 2050 at a point $P_5$ (shown in FIG. 27B) is closest to the virtual light 2010 as indicated by the double headed arrow labelled $d_{L2\text{-}SP1}$ in FIG. 27B.

The image processor 2 also calculates a distance $d_{L1\text{-}P1}$ between the virtual light 2000 (light $L_1$) and the fragment at the point $P_1$, and a distance $d_{L2\text{-}P1}$ between the virtual light 2010 (light $L_2$) and the fragment at the point $P_1$ using known techniques.

FIG. 27C shows distances $d_{L1\text{-}SP2}$, $d_{L2\text{-}SP2}$, $d_{L1\text{-}P2}$, and $d_{L2\text{-}P2}$ which are calculated in a similar way as that described above for the distances shown in FIG. 27B.

More generally, the above calculations are carried out in respect of every virtual light $L_n$ (where n is an integer) and each point $P_m$ (where m is an integer) in a scene by applying known techniques to the respective shadow maps so as to generate values $d_{Ln\text{-}Pm}$ and $d_{Ln\text{-}SPm}$ for each fragment and respective light source. In the examples shown in FIGS. 24 to 27, n=1 to 2 although it will be appreciated that any other suitable number of virtual light sources could be used.

The image processor 2 then uses the calculated distances $d_{Ln\text{-}Pm}$ to $d_{Ln\text{-}SPm}$ to detect whether a fragment at a point $P_m$ is hidden from a virtual light source $L_n$ by a virtual object (i.e. whether a position of the fragment corresponds to a shadow region).

If $d_{Ln\text{-}Pm} = d_{Ln\text{-}SPm}$, then a fragment at a point $P_m$ is the closest fragment to the virtual light $L_n$ along a ray traced between point $P_m$ and the virtual light $L_n$. Therefore the fragment is not occluded and the image processor 2 generates diffuse and specular lighting parameters for $L_n$ and adds the parameters to the lighting parameters for the fragment at the point $P_m$.

However, if $d_{Ln\text{-}Pm} > d_{Ln\text{-}SPm}$, then there is another fragment closer to the virtual light $L_n$ than the fragment at the point $P_m$, meaning that the fragment at the point $P_m$ is hidden from the virtual light source $L_n$ by a virtual object. Therefore, the position of the fragment at the point $P_m$ corresponds with a position of a shadow region. The alpha value of a virtual model can then be modified accordingly as described above.

Where a point $P_m$ is on a virtual object, then any diffuse and specular lighting parameters associated with the virtual light source $L_n$ are not added to the lighting parameters for the fragment at the point $P_m$.

In other words, in examples of the present technique, the image processor detects occluded regions of a virtual model (such as the virtual model 1010) by detecting which fragments of the virtual model correspond to points on the virtual model which are hidden from a respective light source by a virtual object as described above with reference to FIGS. 26 to 27. Those fragments which are hidden from the respective light source by a virtual object are referred to herein as occluded fragments. The image processor 2 can then modify the transparency of the occluded fragments in the occluded regions as described above. However, it will be appreciated that any other suitable method for detecting occluded regions of the virtual model may be used.

It will be appreciated that one or more of the virtual light sources (such as the light source 2000) could be positioned so as to correspond to a position of a real light source in a scene. In this case, the position of the real light source can be estimated as described above with reference to FIGS. 16 to 20 and the virtual light source positioned so as to correspond to the position of the real light source. By applying the techniques described above for rendering computer generated shadows in accordance with examples of the present technique, the computer generated shadows can be generated in such as way so as to give the appearance that a virtual object is casting shadows on a real object by occluding a real light source. This helps improve the realism to a user of the resultant combined images. It will be appreciated that the present technique can accommodate one, two or a plurality of occluded light sources.

Although the modification of the transparency of the virtual model as described above has been described with reference to the use of alpha values, it will be appreciated that any other suitable method of modifying the transparency can be used.

It will be appreciated that in embodiments of the present technique described above, elements of any of the above methods may be implemented in the image processor 2 in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. An image processing system comprising:
    a camera;
    an image processor; and
    a calibration surface including thereon a calibration pattern, the calibration pattern including a plurality of alternately colored elements which provide a corresponding plurality of corners at locations on the calibration pattern at which more than two of the colored elements adjoin, the corner locations defining a first group of lines and a second group of lines, the lines in each of the group of lines being parallel with respect to each other on calibration surface, the first group of lines being orthogonal to the second group of lines, wherein
    the camera is configured to generate a video signal representative of a scene as viewed by the camera, the scene including the calibration surface,
    the image processor is configured
        to detect from the video signal at least some of the corner locations to identify the first and second group of lines of the calibration pattern,
        to extrapolate the lines from each group of lines to determine a presence and a location of a first intersection point on a plane of the scene as viewed by the camera at which the extrapolated lines from the first group intersect and a second intersection point on the plane of scene as viewed by the camera at which the extrapolated lines from the second group intersect, and
        to estimate from the presence and the location of the first and second intersection points one or more of an estimated roll angle value, an estimated pitch angle value and an estimated yaw angle value corresponding to a roll angle, pitch angle and yaw angle of the camera relative to the calibration surface,
    the detection of the corner locations by the image processor includes identifying from the video signal a plurality of potential corner locations, defining an area of the scene as viewed by the camera centered around each potential corner location, analyzing a color of points lying on a periphery of each area, to estimate a likelihood that a corner is located at each potential corner location, and the analyzing of the color of the points lying on the periphery of the area includes dividing the periphery into a first part and a second part, and comparing a distribution of color of the points on the first part with a distribution of color of the points on the second part.

2. The image processing system according to claim 1, wherein each point on the video signal is identified as a potential corner location.

3. The image processing system according to claim 1, wherein the analyzing of the color of the points lying on the periphery of the area includes identifying an estimated corner location at the potential corner location if the distribution of color of the points on the first part and the distribution of color of the points on the second part are substantially similar.

4. The image processing system according to claim 3, wherein the detection of the corner locations includes refining the estimated corner location by defining a further area around the potential corner location, determining edge points around the periphery of the further area at which two of the alternately colored elements meet, and identifying a refined corner location at a point in the centre center of the area at which lines plotted between the edge points intersect.

5. The image processing system according to claim 1, wherein the corner locations are a predetermined distance apart on the calibration surface, the image processor being configured to determine an estimated center point of the calibration surface from a distribution of the corner locations over the calibration pattern and to determine an estimated X displacement value, an estimated Y displacement value and an estimated Z displacement, the estimated X, Y and Z displacement values corresponding to a position in three dimensional space of a position of the camera relative to the calibration surface.

6. The image processing system according to claim 5, wherein the image processor is configured to detect from the video signal representative of the scene at least one of a plurality of markers, each marker being uniquely identifiable by the image processor and occupying a predetermined position on the calibration surface, the image processor being configured to refine at least one of the estimate of the center point and the estimate of the yaw angle based on the at least one detected marker.

7. The image processing system according to claim 1, wherein the calibration pattern is a checkerboard pattern including alternately colored squares.

8. The image processing system according to claim 1, wherein if the extrapolated lines from one of the first or second groups of lines do not all intersect at a point, the image processing apparatus is configured to determine that one of either the roll angle is zero with respect to the calibration surface, or the pitch angle of the camera is normal with respect to the calibration surface.

9. The image processing system according to claim 1, wherein if the extrapolated lines from the first group of lines do not all intersect at a point and the extrapolated lines from the second group of lines do not all intersect at a point, the image processing apparatus is configured to determine that the roll angle is zero and the pitch angle of the camera is normal with respect to the calibration surface.

10. The image processing system according to claim 1, wherein the image processor is configured to generate a composite image including image data derived from the video signal combined with a rendering of a computer generated object, the computer generated object rendered in accordance with the estimated roll angle value, pitch angle value and yaw angle value.

11. The image processing system according to claim 1, wherein the video signal includes a plurality of video frames and the image processor is configured to estimate one or more of the estimated roll angle value, the estimated pitch angle value and the estimated yaw angle value for individual video frames of the video signal.

12. An image processor that receives a video signal from a camera representative of a scene as viewed by the camera, the scene including a calibration surface including thereon a calibration pattern, the calibration pattern including a plurality of alternately colored elements which provide a corresponding plurality of corners at locations on the calibration pattern at which more than two of the colored elements adjoin, the corner locations defining a first group of lines and a second group of lines, the lines in each of the group of lines being parallel with respect to each other and on the calibration surface, the first group of lines being orthogonal to the second group of lines, the image processor comprising:

a detection unit configured to detect from the video signal at least some of the corner locations to identify the first and second group of lines of the calibration pattern;

an extrapolation unit configured to extrapolate the lines from each group of lines to determine a presence and a location of a first intersection point on a plane of the scene as viewed by the camera at which the extrapolated lines from the first group intersect and a second intersection point on the plane of scene as viewed by the camera at which the extrapolated lines from the second group intersect; and an estimating unit configured to estimate from the presence and the location of the first and second intersection points one or more of an estimated roll angle value, an estimated pitch angle value and an estimated yaw angle value corresponding to a roll angle, pitch angle and yaw angle of the camera relative to the calibration surface, wherein the detection of the corner locations by the detection unit includes identifying from the video signal a plurality of potential corner locations, defining an area of the scene as viewed by the camera centered around each potential corner location, analyzing a color of points lying on a periphery of each area to estimate a likelihood that a corner is located at each potential corner location, and the analyzing of the color of the points lying on the periphery of the area includes dividing the periphery into a first part and a second part, and comparing a distribution of color of the points on the first part with a distribution of color of the points on the second part.

13. A method of estimating camera parameters from a captured image, the method comprising:

generating a video signal representative of a scene as viewed by a camera, the scene including a calibration surface including thereon a calibration pattern, the calibration pattern including a plurality of alternately colored elements which provide a corresponding plurality of corners at locations on the calibration pattern at which more than two of the colored elements adjoin, the corner locations defining a first group of lines and a second group of lines, the lines in each of the group of lines being parallel with respect to each other and with respect to the calibration surface, the first group of lines being orthogonal to the second group of lines;

detecting from the video signal at least some of the corner locations to identify the first and second group of lines of the calibration pattern;

extrapolating the lines from each group of lines;

determining from the extrapolated lines a presence and a location of a first intersection point on a plane of the scene as viewed by the camera at which the extrapolated lines from the first group intersect and a second intersection point on the plane of the scene as viewed by the camera at which the extrapolated lines from the second group intersect; and estimating from the presence and the location of the first and second intersection points one or more of an estimated roll angle value, an estimated pitch angle value and an estimated yaw angle value corresponding to a roll angle, pitch angle and yaw angle of the camera relative to the calibration surface, wherein the detecting of the corner locations, includes
identifying from the video signal a plurality of potential corner locations,
defining an area of the scene as viewed by the camera centered around each potential corner location, and
analyzing a color of points lying on a periphery of each area to estimate a likelihood that a corner is located at each potential corner location, the analyzing of the color of the points lying on the periphery of the area including dividing the periphery into a first part and a second part, and comparing a distribution of color of the points on the first part with a distribution of color of the points on the second part.

14. A computer graphics generation system, comprising:

a camera configured to generate video images of a scene captured by the camera, the scene including a calibration surface including thereon a calibration pattern, the calibration pattern including a plurality of alternately colored elements which provide a corresponding plurality of corners at locations on the calibration pattern at which more than two of the colored elements adjoin, the corner locations defining a first group of lines and a second group of lines, the lines in each of the group of lines being parallel with respect to each other and on the calibration surface, the first group of lines being orthogonal to the second group of lines; and an image processor configured to receive the video signal from the camera, and to combine the video images with rendered computer generated objects, the computer generated objects being rendered in accordance with a position and orientation of the camera determined by detecting from the video signal at least some of the corner locations to identify the first and second group of lines of the calibration pattern, extrapolating the lines from each group of lines to determine a presence and a location of a first intersection point on a plane of the scene as viewed by the camera at which the extrapolated lines from the first group intersect and a second intersection point on the plane of scene as viewed by the camera at which the extrapolated lines from the second group intersect, and estimating from the presence and the location of the first and second intersection points one or more of an estimated roll angle value, an estimated pitch angle value and an estimated yaw angle value corresponding to a roll angle, pitch angle and yaw angle of the camera relative to the calibration surface, wherein the detection of the corner locations by the image processor includes identifying from the video signal a plurality of potential corner locations, defining an area of the scene as viewed by the camera centered around each potential corner location, analyzing a color of points lying on a periphery of each area to estimate a likelihood that a corner is located at each potential corner location, and the analyzing of the color of the points lying on the periphery of the area includes dividing the periphery into a first part and a second part, and comparing a distribution of color of the points on the first part with a distribution of color of the points on the second part.

15. A non-transitory computer readable storage medium having computer executable instructions, which when loaded on to a computer cause the computer to perform a method of estimating camera parameters from a captured image, the method comprising:

generating a video signal representative of a scene as viewed by a camera, the scene including a calibration surface including thereon a calibration pattern, the calibration pattern including a plurality of alternately colored elements which provide a corresponding plurality of corners at locations on the calibration pattern at which more than two of the colored elements adjoin, the corner locations defining a first group of lines and a second group of lines, the lines in each of the group of lines being parallel with respect to each other and with respect to the calibration surface, the first group of lines being orthogonal to the second group of lines;

detecting from the video signal at least some of the corner locations to identify the first and second group of lines of the calibration pattern;

extrapolating the lines from each group of lines;

determining from the extrapolated lines a presence and a location of a first intersection point on a plane of the scene as viewed by the camera at which the extrapolated lines from the first group intersect and a second intersection point on the plane of the scene as viewed by the camera at which the extrapolated lines from the second group intersect; and estimating from the presence and the location of the first and second intersection points one or more of an estimated roll angle value, an estimated pitch angle value and an estimated yaw angle value corresponding to a roll angle, pitch angle and yaw angle of the camera relative to the calibration surface, wherein the detecting of the corner locations includes
identifying from the video signal a plurality of potential corner locations,
defining an area of the scene as viewed by the camera centered around each potential corner location, and
analyzing a color of points lying on a periphery of each area to estimate a likelihood that a corner is located at each potential corner location, the analyzing of the color of the points lying on the periphery of the area including dividing the periphery into a first part and a second part, and comparing a distribution of color of the points on the first part with a distribution of color of the points on the second part.

16. An apparatus for estimating camera parameters from a captured image, the apparatus comprising:

means for generating a video signal representative of a scene as viewed by a camera, the scene including a calibration surface including thereon a calibration pattern, the calibration pattern including a plurality of alternately colored elements which provide a corresponding plurality of corners at locations on the calibration pattern at which more than two of the colored elements adjoin, the corner locations defining a first group of lines and a second group of lines, the lines in each of the group of lines being parallel with respect to each other and with respect to the calibration surface, the first group of lines being orthogonal to the second group of lines;

means for detecting from the video signal at least some of the corner locations to identify the first and second group of lines of the calibration pattern;

means for extrapolating the lines from each group of lines;

means for determining from the extrapolated lines a presence and a location of a first intersection point on a plane of the scene as viewed by the camera at which the extrapolated lines from the first group intersect and a second intersection point on the plane of the scene as viewed by the camera at which the extrapolated lines from the second group intersect; and means for estimating from the presence and the location of the first and second intersection points one or more of an estimated roll angle value, an estimated pitch angle value and an estimated yaw angle value corresponding to a roll angle, pitch angle and yaw angle of the camera relative to the calibration surface, wherein the means for detecting the corner locations includes
  means for identifying from the video signal a plurality of potential corner locations,
  means for defining an area of the scene as viewed by the camera centered around each potential corner location, and
  means for analyzing a color of points lying on a periphery of each area to estimate a likelihood that a corner is located at each potential corner location, the means for analyzing the color of the points lying on the periphery of the area including means for dividing the periphery into a first part and a second part, and means for comparing a distribution of color of the points on the first part with a distribution of color of the points on the second part.

* * * * *